(12) United States Patent
Wang et al.

(10) Patent No.: US 10,432,326 B2
(45) Date of Patent: Oct. 1, 2019

(54) METHOD, APPARATUS, DEVICE, AND SYSTEM FOR ANTENNA ALIGNMENT

(71) Applicant: Huawei Technologies Co., Ltd., Shenzhen, Guangdong (CN)

(72) Inventors: Lei Wang, Shanghai (CN); Ganghua Yang, Boulogne Billancourt (FR)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 129 days.

(21) Appl. No.: 15/607,349

(22) Filed: May 26, 2017

(65) Prior Publication Data

US 2017/0264377 A1 Sep. 14, 2017

Related U.S. Application Data

(63) Continuation of application No. PCT/CN2014/092440, filed on Nov. 28, 2014.

(51) Int. Cl.
| | |
|---|---|
| *H04B 17/12* | (2015.01) |
| *H01Q 1/08* | (2006.01) |
| *H01Q 1/12* | (2006.01) |
| *H04B 7/02* | (2018.01) |
| *H04B 7/06* | (2006.01) |
| *H04B 17/318* | (2015.01) |

(52) U.S. Cl.
CPC ............ *H04B 17/12* (2015.01); *H01Q 1/084* (2013.01); *H01Q 1/1257* (2013.01); *H04B 7/02* (2013.01); *H04B 7/0654* (2013.01); *H04B 7/0695* (2013.01); *H04B 17/318* (2015.01)

(58) Field of Classification Search
CPC ...... H01Q 1/084; H01Q 1/1257; H04B 17/12; H04B 17/318; H04B 7/02; H04B 7/0654; H04B 7/0695
USPC ......................................................... 342/373
See application file for complete search history.

(56) References Cited

U.S. PATENT DOCUMENTS

| | | | |
|---|---|---|---|
| 5,341,147 A * | 8/1994 | Scott .................... | H01Q 1/1257 342/174 |
| 5,929,808 A | 7/1999 | Hassan et al. | |
| 7,298,325 B2 | 11/2007 | Krikorian et al. | |

(Continued)

FOREIGN PATENT DOCUMENTS

| | | |
|---|---|---|
| CN | 101478336 A | 7/2009 |
| CN | 102725968 A | 10/2012 |

(Continued)

*Primary Examiner* — Timothy X Pham
(74) *Attorney, Agent, or Firm* — Womble Bond Dickinson (US) LLP

(57) ABSTRACT

The present disclosure discloses a method, an apparatus, a device, and a system for antenna alignment. The method includes: performing, according to a target preset condition, adjustment processing on a phase and an amplitude of a signal that is transmitted by each antenna unit of a first antenna, and the second antenna is located within a coverage scope of the target beam; and determining that a difference between a horizontal angle of the target beam and a mechanical horizontal angle of a current mechanical location of the first antenna is a horizontal angle, that needs to be adjusted, of the first antenna, adjusting the mechanical horizontal angle and the mechanical pitch angle of the first antenna according to the horizontal angle that needs to be adjusted and the pitch angle that needs to be adjusted.

19 Claims, 6 Drawing Sheets

(56) References Cited

U.S. PATENT DOCUMENTS

| | | |
|---|---|---|
| 2007/0126629 A1 | 6/2007 | Krikorian et al. |
| 2010/0167675 A1 | 7/2010 | Zhao |
| 2012/0062423 A1* | 3/2012 | Lo ........................ H01Q 1/2258 342/374 |
| 2012/0098694 A1* | 4/2012 | Hansen ............... G01S 13/4454 342/154 |
| 2012/0119943 A1* | 5/2012 | Bergeron ............ G01S 13/9005 342/25 F |
| 2013/0201855 A1 | 8/2013 | Luo et al. |
| 2013/0223251 A1 | 8/2013 | Li et al. |
| 2013/0307719 A1* | 11/2013 | Granet ................ G01S 13/4409 342/153 |
| 2014/0347222 A1 | 11/2014 | Ling |

FOREIGN PATENT DOCUMENTS

| | | |
|---|---|---|
| CN | 104113363 A | 10/2014 |
| KR | 20140129051 A | 11/2014 |
| WO | 2010140149 A1 | 12/2010 |

\* cited by examiner

100

┌─────────────────────────────────────────────────────────────┐
│ Perform, according to a target preset condition, adjustment processing
│ on a phase and an amplitude of a signal that is transmitted by each
│ antenna unit of a first antenna, where the target preset condition
│ includes: a width of a target beam is less than or equal to a target width,
│ and a second antenna is located within a coverage scope of the target
│ beam, where the target beam is a beam formed by signals that are
│ transmitted by multiple antenna units of the first antenna after the
│ adjustment processing
└─────────────────────────────────────────────────────────────┘ ~S110

┌─────────────────────────────────────────────────────────────┐
│ Determine that a difference between a horizontal angle of the target
│ beam and a mechanical horizontal angle of a current mechanical
│ location of the first antenna is a horizontal angle, that needs to be
│ adjusted, of the first antenna, determine that a difference between a pitch
│ angle of the target beam and a mechanical pitch angle of the current
│ mechanical location of the first antenna is a pitch angle, that needs to be
│ adjusted, of the first antenna, and adjust the mechanical horizontal angle
│ and the mechanical pitch angle of the first antenna according to the
│ horizontal angle that needs to be adjusted and the pitch angle that needs
│ to be adjusted, where the mechanical location includes the mechanical
│ horizontal angle and the mechanical pitch angle
└─────────────────────────────────────────────────────────────┘ ~S120

FIG. 1

METHOD, APPARATUS, DEVICE, AND SYSTEM FOR ANTENNA ALIGNMENT

CROSS-REFERENCE TO RELATED APPLICATION

This application is a continuation of the International Application No. PCT/CN2014/092440, filed on Nov. 28, 2014, the disclosure of which is hereby incorporated by reference in its entirety.

TECHNICAL FIELD

The present application relates to the communications field, and in particular, to a method, an apparatus, a device, and a system for antenna alignment in the communications field.

BACKGROUND

Due to advantages such as a large capacity, good directionality, and a long transmission distance, microwave communication is widely applied in the relay field, and the like. A beam width of a microwave antenna is generally narrow, and before transmission, directions of a transmit antenna and a receive antenna need to be manually aligned, to ensure successful communication.

A frequently used method for antenna calibration is to set a received signal strength indication (RSSI) interface on an outdoor unit (ODU), and a detection circuit inside the ODU outputs an RSSI voltage according to a strength of a received signal. Staff first perform coarse adjustment on antennas according to the latitudes, longitudes, and altitudes of locations of the antennas, to implement rough alignment of the transmit antenna and the receive antenna, and then monitor a value of the RSSI voltage while adjusting mechanical horizontal angles and mechanical pitch angles of the antennas, until the RSSI voltage reaches a preset threshold.

For the foregoing method, the mechanical horizontal angles and the mechanical pitch angles of the antennas at the two ends need to be manually adjusted continuously according to the RSSI voltage in an alignment process, and different directions need to be tried in space; this is time-consuming and energy-consuming, and accuracy of the method is relatively low.

SUMMARY

Embodiments of the present disclosure provide a method, an apparatus, a device, and a system for antenna alignment, so as to implement convenient and quick antenna alignment with high accuracy.

According to a first aspect, a method for antenna alignment is provided, where the method is executed by an apparatus for antenna alignment in a system for antenna alignment, the system further includes a first antenna and a second antenna, the first antenna includes multiple antenna units, and the method includes:

performing, according to a target preset condition, adjustment processing on a phase and an amplitude of a signal that is transmitted by each antenna unit of the first antenna, where the target preset condition includes: a width of a target beam is less than or equal to a target width, and the second antenna is located within a coverage scope of the target beam, where the target beam is a beam formed by signals that are transmitted by the multiple antenna units of the first antenna after the adjustment processing; and determining that a difference between a horizontal angle of the target beam and a mechanical horizontal angle of a current mechanical location of the first antenna is a horizontal angle, that needs to be adjusted, of the first antenna, determining that a difference between a pitch angle of the target beam and a mechanical pitch angle of the current mechanical location of the first antenna is a pitch angle, that needs to be adjusted, of the first antenna, and adjusting the mechanical horizontal angle and the mechanical pitch angle of the first antenna according to the horizontal angle that needs to be adjusted and the pitch angle that needs to be adjusted.

With reference to the first aspect, in a first possible implementation manner of the first aspect, after the performing, according to a target preset condition, adjustment processing on a phase and an amplitude of a signal that is transmitted by each antenna unit, the method further includes:

adjusting a mechanical horizontal angle and a mechanical pitch angle of the second antenna, so that a power of the target beam received by the second antenna is the maximum.

With reference to the first aspect, in a second possible implementation manner of the first aspect, the performing, according to a target preset condition, adjustment processing on a phase and an amplitude of a signal that is transmitted by each antenna unit includes:

performing, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where the $(K-1)^{th}$ beam is a beam that is formed by the signals after $K-1^{th}$ adjustment processing, $N \geq 2$, and K is an integer greater than or equal to 2 and less than or equal to N; and when K is equal to N, the phase and the amplitude of the signal after the $K^{th}$ adjustment processing meet an $N^{th}$ iterative condition and meet the target preset condition.

With reference to the second possible implementation manner of the first aspect, in a third possible implementation manner of the first aspect, before the $K^{th}$ adjustment processing is performed, the method further includes:

adjusting a mechanical horizontal angle and a mechanical pitch angle of the second antenna, so that a power of the $(K-1)^{th}$ beam received by the second antenna is the maximum.

With reference to the second possible implementation manner of the first aspect, in a fourth possible implementation manner of the first aspect, before the $K^{th}$ adjustment processing is performed, the method further includes:

adjusting the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

With reference to any possible implementation manner of the second to fourth possible implementation manners of the first aspect, in a fifth possible implementation manner of the first aspect, the performing the $K^{th}$ adjustment processing includes:

adjusting, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, where a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$, and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \operatorname{Re}\left\{ \left( \tilde{c}_m - \frac{j\tilde{f}_w}{|f_w|^2} \operatorname{Im}\{\tilde{c}_m f_w^*\} \right)(f_w - \tilde{f}_w)^* \right\} d\phi d\varphi \\ \theta_m^{(K)} = \theta_m^{(K-1)} + \\ 2h\mu \int_{\phi,\varphi} e^{h|f_w - \tilde{f}_w|^2} \operatorname{Im}\left\{ \left( c_m + \frac{\tilde{f}_w}{|f_w|^2} \operatorname{Re}\{c_m f_w\} \right)(f_w - \tilde{f}_w)^* \right\} d\phi d\varphi \end{cases}$$

$$\tilde{c}_m = e^{j\left(\frac{2\pi}{\lambda} m \sin\phi + \theta_m\right)} \quad c_m = r_m e^{j\left(\frac{2\pi}{\lambda} m \sin\phi + \theta_m\right)}$$

$$f_w(\phi, \varphi) = \sum_{m=0}^{M-1} w_m e^{j\frac{2\pi}{\lambda}(x_m, y_m, z_m)\begin{pmatrix} \cos\varphi\sin\phi \\ \cos\varphi\cos\phi \\ -\sin\varphi \end{pmatrix}}$$

$$= \sum_{m=0}^{M-1} w_m e^{j\frac{2\pi}{\lambda}(x_m \cos\varphi\sin\phi - z_m \sin\varphi)}$$

$$\tilde{f}_w(\phi, \varphi) = A e^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m, y_m, z_m)$ is coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

With reference to the first aspect and any possible implementation manner of the first to fifth possible implementation manners of the first aspect, in a sixth possible implementation manner of the first aspect, the target width is five degrees.

With reference to the first aspect and any possible implementation manner of the first to sixth possible implementation manners of the first aspect, in a seventh possible implementation manner of the first aspect, before the performing, according to a target preset condition, adjustment processing on a phase and an amplitude of a signal that is transmitted by each antenna unit, the method further includes:

obtaining location information of the first antenna and the second antenna that are to be aligned; and adjusting the mechanical horizontal angles and the mechanical pitch angles of the first antenna and the second antenna according to the location information.

With reference to the seventh possible implementation manner of the first aspect, in an eighth possible implementation manner of the first aspect, the obtaining location information of the first antenna and the second antenna that are to be aligned includes:

obtaining the location information, of the first antenna and the second antenna, obtained by means of triangulation or global positioning system GPS positioning.

According to a second aspect, an apparatus for antenna alignment is provided, where the apparatus is in communication connection with a first antenna, and is in communication connection with a second antenna, and the apparatus includes:

a first adjustment unit, configured to perform, according to a target preset condition, adjustment processing on a phase and an amplitude of a signal that is transmitted by each antenna unit of the first antenna, where the target preset condition includes: a width of a target beam is less than or equal to a target width, and the second antenna is located within a coverage scope of the target beam, where the target beam is abeam formed by signals that are transmitted by multiple antenna units of the first antenna after the adjustment processing; and a second adjustment unit, configured to determine that a difference between a horizontal angle of the target beam and a mechanical horizontal angle of a current mechanical location of the first antenna is a horizontal angle, that needs to be adjusted, of the first antenna, determine that a difference between a pitch angle of the target beam and a mechanical pitch angle of the current mechanical location of the first antenna is a pitch angle, that needs to be adjusted, of the first antenna, and adjust the mechanical horizontal angle and the mechanical pitch angle of the first antenna according to the horizontal angle that needs to be adjusted and the pitch angle that needs to be adjusted.

With reference to the second aspect, in a first possible implementation manner of the second aspect, the apparatus further includes:

a third adjustment unit, configured to: after the adjustment processing is performed, according to the target preset condition, on the phase and the amplitude of the signal that is transmitted by each antenna unit, adjust a mechanical horizontal angle and a mechanical pitch angle of the second antenna, so that a power of the target beam received by the second antenna is the maximum.

With reference to the second aspect, in a second possible implementation manner of the second aspect, the first adjustment unit is specifically configured to:

perform, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna is located within a coverage scope of the $K^{th}$ beam, where the $K^{th}$ width is less than a (K−1)$^{th}$ width, and the coverage scope of the K$^{th}$ beam is within a coverage scope of a (K−1)$^{th}$ beam, where the (K−1)$^{th}$ beam is a beam that is formed by the signals after K−1$^{th}$ adjustment processing, N≥2, and K is an integer greater than or equal to 2 and less than or equal to N; and when K is equal to N, the phase and the amplitude of the signal after the K$^{th}$ adjustment processing meet an N$^{th}$ iterative condition and meet the target preset condition.

With reference to the second possible implementation manner of the second aspect, in a third possible implementation manner of the second aspect, before performing the K$^{th}$ adjustment processing, the first adjustment unit is further configured to:

adjust a mechanical horizontal angle and a mechanical pitch angle of the second antenna, so that a power of the (K−1)$^{th}$ beam received by the second antenna is the maximum.

With reference to the second possible implementation manner of the second aspect, in a fourth possible implementation manner of the second aspect, before performing the K$^{th}$ adjustment processing, the first adjustment unit is further configured to:

adjust the mechanical horizontal angle and the mechanical pitch angle of the first antenna according to a difference between a horizontal angle of the (K−1)$^{th}$ beam and the mechanical horizontal angle of the current mechanical location of the first antenna and a difference between a pitch angle of the (K−1)$^{th}$ beam and the mechanical pitch angle of the current mechanical location of the first antenna.

With reference to any possible implementation manner of the second to fourth possible implementation manners of the second aspect, in a fifth possible implementation manner of the second aspect, the performing, by the first adjustment unit, the K$^{th}$ adjustment processing includes:

adjusting, according to the K$^{th}$ iterative condition, the phase and the amplitude of the signal that is transmitted by each antenna unit of the first antenna, so that the signals that are transmitted by the multiple antenna units after the K$^{th}$ adjustment processing form the K$^{th}$ beam, where a phase is $\theta_m^{(K-1)}$ and an amplitude is $r_m^{(K-1)}$ when an m$^{th}$ antenna unit of the multiple antenna units sends the (K−1)$^{th}$ beam, and a phase $\theta_m^{(K)}$ and an amplitude $r_m^{(K)}$ when the m$^{th}$ antenna unit sends the K$^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \text{Re}\left\{\left(\tilde{c}_m - \frac{j\tilde{f}_w}{|f_w|^2}\text{Im}\{\tilde{c}_m f_w^*\}\right)(f_w - \tilde{f}_w)^*\right\} d\phi d\varphi \\ \theta_m^{(K)} = \theta_m^{(K-1)} + \\ 2h\mu \int_{\phi,\varphi} e^{h|f_w - \tilde{f}_w|^2} \text{Im}\left\{\left(c_m + \frac{\tilde{f}_w}{|f_w|^2}\text{Re}\{c_m f_w\}\right)(f_w - \tilde{f}_w)^*\right\} d\phi d\varphi \end{cases}$$

$$\tilde{c}_m = e^{j\left(\frac{2\pi}{\lambda} m d \sin\phi + \theta_m\right)} \quad c_m = r_m e^{j\left(\frac{2\pi}{\lambda} m d \sin\phi + \theta_m\right)}$$

$$f_w(\phi,\varphi) = \sum_{m=0}^{M-1} w_m e^{j\frac{2\pi}{\lambda}(x_m, y_m, z_m) \begin{pmatrix} \cos\varphi\sin\phi \\ \cos\varphi\cos\phi \\ -\sin\varphi \end{pmatrix}}$$

$$= \sum_{m=0}^{M-1} w_m e^{j\frac{2\pi}{\lambda}(x_m \cos\varphi\sin\phi - z_m \sin\varphi)}$$

$$\tilde{f}_w(\phi,\varphi) = Ae^{j\arg(f_w(\phi,\varphi))}$$

where an initial value is $r_m^{(1)}=1$, $\theta_m^{(1)}=0$, μ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m, y_m, z_m)$ is coordinates of the m$^{th}$ antenna unit relative to the first antenna, ϕ and φ are respectively a horizontal angle value range and a pitch angle value range of the K$^{th}$ beam relative to the current mechanical location of the first antenna, and ϕ and φ enable the width of the K$^{th}$ beam to be the K$^{th}$ width and the second antenna to be located in the coverage scope of the K$^{th}$ beam, where the K$^{th}$ width is less than the (K−1)$^{th}$ width, and the coverage scope of the K$^{th}$ beam is within the coverage scope of the (K−1)$^{th}$ beam.

With reference to the second aspect and any possible implementation manner of the first to fifth possible implementation manners of the second aspect, in a sixth possible implementation manner of the second aspect, the target width is five degrees.

With reference to the second aspect and any possible implementation manner of the first to sixth possible implementation manners of the second aspect, in a seventh possible implementation manner of the second aspect, the apparatus further includes:

an obtaining unit, configured to: before the adjustment processing is performed, according to the target preset condition, on the phase and the amplitude of the signal that is transmitted by each antenna unit, obtain location information of the first antenna and the second antenna that are to be aligned; and a fourth adjustment unit, configured to adjust the mechanical horizontal angles and the mechanical pitch angles of the first antenna and the second antenna according to the location information.

With reference to the seventh possible implementation manner of the second aspect, in an eighth possible implementation manner of the second aspect, the obtaining unit is specifically configured to:

obtain the location information, of the first antenna and the second antenna, obtained by means of triangulation or global positioning system GPS positioning.

According to a third aspect, a device for antenna alignment is provided, where the device is in communication connection with a first antenna, and is in communication connection with a second antenna, and the device includes:

a bus;

a processor connected to the bus; and a memory connected to the bus, where the processor invokes, by using the bus, a program stored in the memory, to perform, according to a target preset condition, adjustment processing on a phase and an amplitude of a signal that is transmitted by each antenna unit of the first antenna, where the target preset condition includes: a width of a target beam is less than or equal to a target width, and the second antenna is located within a coverage scope of the target beam, where the target beam is a beam formed by signals that are transmitted by multiple antenna units of the first antenna after the adjustment processing; and determine that a difference between a horizontal angle of the target beam and a mechanical horizontal angle of a current mechanical location of the first antenna is a horizontal angle, that needs to be adjusted, of the first antenna, determine that a difference between a pitch angle of the target beam and a mechanical pitch angle of the current mechanical location of the first antenna is a pitch angle, that needs to be adjusted, of the first antenna, and adjust the mechanical horizontal angle and the mechanical pitch angle of the first antenna according to the horizontal angle that needs to be adjusted and the pitch angle that needs to be adjusted.

With reference to the third aspect, in a first possible implementation manner of the third aspect, the processor is further configured to: after performing, according to the target preset condition, the adjustment processing on the phase and the amplitude of the signal that is transmitted by each antenna unit, adjust a mechanical horizontal angle and a mechanical pitch angle of the second antenna, so that a power of the target beam received by the second antenna is the maximum.

With reference to the third aspect, in a second possible implementation manner of the third aspect, the processor is specifically configured to:

perform, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where the $(K-1)^{th}$ beam is a beam that is formed by the signals after $K-1^{th}$ adjustment processing, $N \geq 2$, and K is an integer greater than or equal to 2 and less than or equal to N; and when K is equal to N, the phase and the amplitude of the signal after the $K^{th}$ adjustment processing meet an $N^{th}$ iterative condition and meet the target preset condition.

With reference to the second possible implementation manner of the third aspect, in a third possible implementation manner of the third aspect, the processor is specifically configured to:

before performing the $K^{th}$ adjustment processing, adjust a mechanical horizontal angle and a mechanical pitch angle of the second antenna, so that a power of the $(K-1)^{th}$ beam received by the second antenna is the maximum.

With reference to the second possible implementation manner of the third aspect, in a fourth possible implementation manner of the third aspect, the processor is specifically configured to:

before performing the $K^{th}$ adjustment processing, adjust the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

With reference to any possible implementation manner of the second to fourth possible implementation manners of the third aspect, in a fifth possible implementation manner of the third aspect, the performing, by the processor, the $K^{th}$ adjustment processing includes:

adjusting, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, where a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$ and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \text{Re}\left\{ \left( \tilde{c}_m - \frac{j\tilde{f}_w}{|f_w|^2} \text{Im}\{\tilde{c}_m f_w^*\} \right) (f_w - \tilde{f}_w)^* \right\} d\phi d\varphi \\ \theta_m^{(K)} = \theta_m^{(K-1)} + \\ 2h\mu \int_{\phi,\varphi} e^{h|f_w - \tilde{f}_w|^2} \text{Im}\left\{ \left( c_m + \frac{\tilde{f}_w}{|f_w|^2} \text{Re}\{c_m f_w\} \right) (f_w - \tilde{f}_w)^* \right\} d\phi d\varphi \end{cases}$$

$$\tilde{c}_m = e^{j\left(\frac{2\pi}{\lambda} m d \sin\phi + \theta_m\right)} \quad c_m = r_m e^{j\left(\frac{2\pi}{\lambda} m d \sin\phi + \theta_m\right)}$$

$$f_w(\phi,\varphi) = \sum_{m=0}^{M-1} w_m e^{j\frac{2\pi}{\lambda}(x_m,y_m,z_m)\begin{pmatrix} \cos\varphi\sin\phi \\ \cos\varphi\cos\phi \\ -\sin\varphi \end{pmatrix}}$$

$$= \sum_{m=0}^{M-1} w_m e^{j\frac{2\pi}{\lambda}(x_m\cos\varphi\sin\phi - z_m\sin\varphi)}$$

$$\tilde{f}_w(\phi,\varphi) = A e^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m,y_m,z_m)$ is coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

With reference to the third aspect and any possible implementation manner of the first to fifth possible implementation manners of the third aspect, in a sixth possible implementation manner of the third aspect, the target width is five degrees.

With reference to the third aspect and any possible implementation manner of the first to sixth possible implementation manners of the third aspect, in a seventh possible implementation manner of the third aspect, the device further includes:

a receiver, configured to: before the adjustment processing is performed, according to the target preset condition, on the phase and the amplitude of the signal that is transmitted by each antenna unit, obtain location information of the first antenna and the second antenna that are to be aligned; and the processor is further configured to:

adjust the mechanical horizontal angles and the mechanical pitch angles of the first antenna and the second antenna according to the location information.

With reference to the seventh possible implementation manner of the third aspect, in an eighth possible implementation manner of the third aspect, the receiver is specifically configured to:

obtain the location information, of the first antenna and the second antenna, obtained by means of triangulation or global positioning system GPS positioning.

According to a fourth aspect, a system for antenna alignment is provided, including:

a first antenna, including multiple antenna units;

a second antenna; and an apparatus for antenna alignment, in communication connection with the first antenna, in communication connection with the second antenna, and configured to perform, according to a target preset condition, adjustment processing on a phase and an amplitude of a signal that is transmitted by each antenna unit of the first antenna, where the target preset condition includes: a width of a target beam is less than or equal to a target width, and the second antenna is located within a coverage scope of the target beam, where the target beam is a beam formed by signals that are transmitted by the multiple antenna units of the first antenna after the adjustment processing; and configured to determine that a difference between a horizontal angle of the target beam and a mechanical horizontal angle of a current mechanical location of the first antenna is a horizontal angle, that needs to be adjusted, of the first antenna, determine that a difference between a pitch angle of the target beam and a mechanical pitch angle of the current mechanical location of the first antenna is a pitch angle, that needs to be adjusted, of the first antenna, and adjust the mechanical horizontal angle and the mechanical pitch angle of the first antenna according to the horizontal angle that needs to be adjusted and the pitch angle that needs to be adjusted.

With reference to the fourth aspect, in a first possible implementation manner of the fourth aspect, the apparatus for antenna alignment is further configured to:

after performing, according to the target preset condition, the adjustment processing on the phase and the amplitude of the signal that is transmitted by each antenna unit, adjust a mechanical horizontal angle and a mechanical pitch angle of the second antenna, so that a power of the target beam received by the second antenna is the maximum.

With reference to the fourth aspect, in a second possible implementation manner of the fourth aspect, the performing, by the apparatus for antenna alignment, according to a target preset condition, adjustment processing on a phase and an amplitude of a signal that is transmitted by each antenna unit includes:

performing, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where the $(K-1)^{th}$ beam is a beam that is formed by the signals after $K-1^{th}$ adjustment processing, $N \geq 2$, and $K$ is an integer greater than or equal to 2 and less than or equal to $N$; and when $K$ is equal to $N$, the phase and the amplitude of the signal after the $K^{th}$ adjustment processing meet an $N^{th}$ iterative condition and meet the target preset condition.

With reference to the second possible implementation manner of the fourth aspect, in a third possible implementation manner of the fourth aspect, before performing the $K^{th}$ adjustment processing, the apparatus for antenna alignment is further configured to:

adjust a mechanical horizontal angle and a mechanical pitch angle of the second antenna, so that a power of the $(K-1)^{th}$ beam received by the second antenna is the maximum.

With reference to the second possible implementation manner of the fourth aspect, in a fourth possible implementation manner of the fourth aspect, before performing the $K^{th}$ adjustment processing, the apparatus for antenna alignment is further configured to:

adjust the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

With reference to any possible implementation manner of the second to fourth possible implementation manners of the fourth aspect, in a fifth possible implementation manner of the fourth aspect, the performing, by the apparatus for antenna alignment, the $K^{th}$ adjustment processing includes:

adjusting, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, where a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$ and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \operatorname{Re}\left\{\left(\tilde{c}_m - \frac{j\tilde{f}_w}{|f_w|^2}\operatorname{Im}\{\tilde{c}_m f_w^*\}\right)(f_w - \tilde{f}_w)^*\right\} d\phi d\varphi \\ \theta_m^{(K)} = \theta_m^{(K-1)} + \\ 2h\mu \int_{\phi,\varphi} e^{h|f_w - \tilde{f}_w|^2} \operatorname{Im}\left\{\left(c_m + \frac{\tilde{f}_w}{|f_w|^2}\operatorname{Re}\{c_m f_w\}\right)(f_w - \tilde{f}_w)^*\right\} d\phi d\varphi \end{cases}$$

$$\tilde{c}_m = e^{j\left(\frac{2\pi}{\lambda}md\sin\phi + \theta_m\right)} \quad c_m = r_m e^{j\left(\frac{2\pi}{\lambda}md\sin\phi + \theta_m\right)}$$

$$f_w(\phi, \varphi) = \sum_{m=0}^{M-1} w_m e^{j\frac{2\pi}{\lambda}(x_m, y_m, z_m)\begin{pmatrix}\cos\varphi\sin\phi \\ \cos\varphi\cos\phi \\ -\sin\varphi\end{pmatrix}}$$

$$= \sum_{m=0}^{M-1} w_m e^{j\frac{2\pi}{\lambda}(x_m\cos\varphi\sin\phi - z_m\sin\varphi)}$$

$$\tilde{f}_w(\phi, \varphi) = Ae^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m, y_m, z_m)$ is coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

With reference to the fourth aspect and any possible implementation manner of the first to fifth possible implementation manners of the fourth aspect, in a sixth possible implementation manner of the fourth aspect, the target width is five degrees.

With reference to the fourth aspect and any possible implementation manner of the first to sixth possible implementation manners of the fourth aspect, in a seventh possible implementation manner of the fourth aspect, the apparatus for antenna alignment is further configured to:

before performing, according to the target preset condition, the adjustment processing on the phase and the amplitude of the signal that is transmitted by each antenna unit, obtain location information of the first antenna and the second antenna that are to be aligned; and adjust the mechanical horizontal angles and the mechanical pitch angles of the first antenna and the second antenna according to the location information.

With reference to the seventh possible implementation manner of the fourth aspect, in an eighth possible implementation manner of the fourth aspect, the obtaining, by the apparatus for antenna alignment, location information of the first antenna and the second antenna that are to be aligned includes:

obtaining the location information, of the first antenna and the second antenna, obtained by means of triangulation or global positioning system GPS positioning.

Based on the foregoing technical solutions, by means of a method, an apparatus, a device, and a system for antenna alignment that are provided in embodiments of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

BRIEF DESCRIPTION OF DRAWINGS

To describe the technical solutions in the embodiments of the present disclosure more clearly, the following briefly describes the accompanying drawings required for describing the embodiments of the present disclosure or the prior art. Apparently, the accompanying drawings in the following description show merely some embodiments of the present disclosure, and a person of ordinary skill in the art may still derive other drawings from these accompanying drawings without creative efforts.

FIG. 1 is a schematic flowchart of a method for antenna alignment according to an embodiment of the present disclosure;

DESCRIPTION OF EMBODIMENTS

Figure 2:
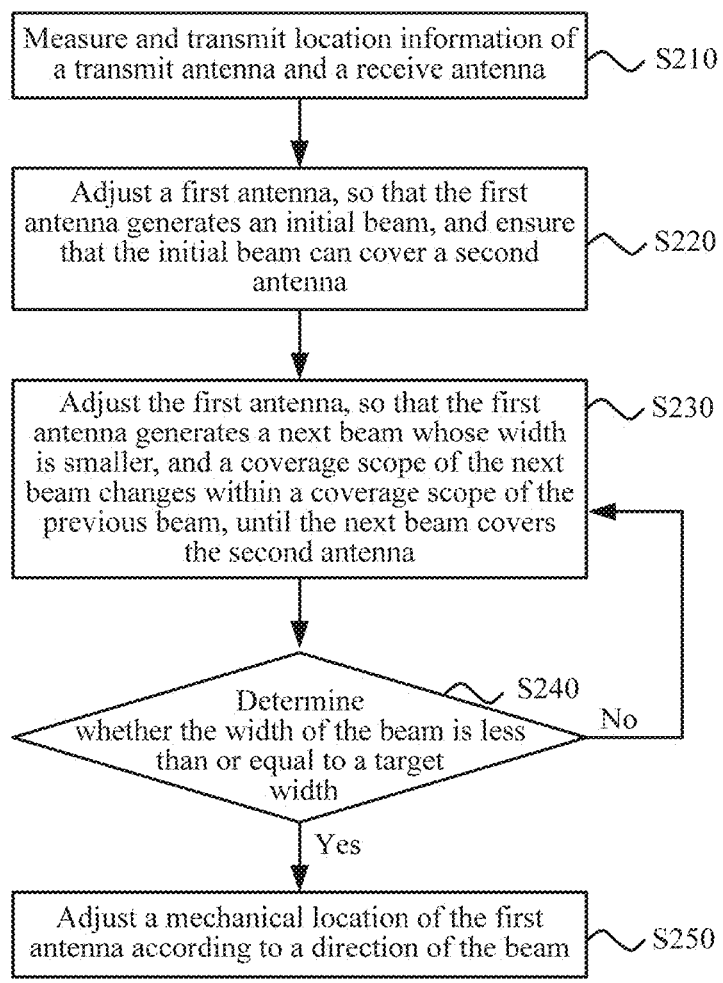
FIG. 2 is a schematic flowchart of a method for antenna alignment according to an embodiment of the present disclosure.

The following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Aspects or features of the present disclosure may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk, compact disk), a DVD (Digital Versatile Disk, digital versatile disk), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

FIG. 1 is a schematic flowchart of a method 100 for antenna alignment according to an embodiment of the present disclosure. As shown in FIG. 1, the method 100 is executed by an apparatus for antenna alignment in a system for antenna alignment, the system further includes a first antenna and a second antenna that are to be aligned, the first antenna includes multiple antenna units, the apparatus for antenna alignment may be an independent apparatus or may be integrated in an aligned antenna, and the method 100 includes:

S110: Perform, according to a target preset condition, adjustment processing on a phase and an amplitude of a signal that is transmitted by each antenna unit of the first antenna, where the target preset condition includes: a width of a target beam is less than or equal to a target width, and the second antenna is located within a coverage scope of the target beam, where the target beam is a beam formed by signals that are transmitted by the multiple antenna units of the first antenna after the adjustment processing.

S120: Determine that a difference between a horizontal angle of the target beam and a mechanical horizontal angle of a current mechanical location of the first antenna is a horizontal angle, that needs to be adjusted, of the first antenna, determine that a difference between a pitch angle of the target beam and a mechanical pitch angle of the current mechanical location of the first antenna is a pitch angle, that needs to be adjusted, of the first antenna, and adjust the mechanical horizontal angle and the mechanical pitch angle of the first antenna according to the horizontal angle that needs to be adjusted and the pitch angle that needs to be adjusted.

Specifically, the method for antenna alignment in this embodiment of the present disclosure may be applied to antenna alignment in which a transmit antenna is a multi-array antenna, or a multi-array antenna for alignment may be additionally mounted on a single antenna, and the method 100 is applied to the additionally mounted multi-array antenna to implement alignment of the multi-array antenna, and then a mechanical horizontal angle and a mechanical pitch angle of the single antenna are adjusted according to a mechanical horizontal angle and a mechanical pitch angle of the aligned multi-array antenna, so as to implement alignment of the single antenna. Multiple antenna units in the multi-array antenna may be a uniform linear array, or may be a uniform planar array. After the phase and the amplitude of the signal that is transmitted by each antenna unit of the transmit antenna are adjusted, the multi-array antenna may generate a beam with any width, so that the target beam transmitted by the transmit antenna covers the receive antenna, and the width of the target beam is less than or equal to the target width.

In this case, a difference between a horizontal angle of the target beam and a horizontal angle of a current mechanical location of the transmit antenna and a difference between a pitch angle of the target beam and a pitch angle of the current mechanical location of the transmit antenna may be obtained. It is determined that the difference between the horizontal angle of the target beam and the mechanical horizontal angle of the current mechanical location of the first antenna is a horizontal angle, that needs to be adjusted, of the first antenna, and that the difference between the pitch angle of the target beam and the mechanical pitch angle of the current mechanical location of the first antenna is a pitch angle, that needs to be adjusted, of the first antenna, and the mechanical horizontal angle and the mechanical pitch angle of the transmit antenna may be adjusted according to the horizontal angle that needs to be adjusted and the pitch angle that needs to be adjusted. That is, the transmit antenna is horizontally adjusted by an angle with a value of the horizontal angle that needs to be adjusted, and the transmit antenna is vertically adjusted by an angle with a value of the pitch angle that needs to be adjusted, which can implement alignment of the transmit antenna and the receive antenna.

It should be understood that, in this embodiment of the present disclosure, the transmit antenna of the two antennas to be aligned is defined as the first antenna, and the receive antenna is defined as the second antenna. After antenna alignment is performed by using one antenna as the transmit antenna, transmit-receive roles of the two antennas may be interchanged, to use the method 100 to perform antenna alignment again. This is not limited in this embodiment of the present disclosure.

It should be further understood that, in this embodiment of the present disclosure, the antenna alignment refers to mechanical alignment of an antenna, or is referred to as physical alignment of an antenna, and refers to adjusting a mechanical horizontal angle and a mechanical pitch angle of the antenna to align the transmit antenna and the receive antenna.

According to an accuracy requirement, the target width may be set to 3 degrees, 5 degrees, or 10 degrees, and is no limited in this embodiment of the present disclosure.

Therefore, by means of the method for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

Optionally, in an embodiment, in S110, the performing, according to a target preset condition, adjustment processing on a phase and an amplitude of a signal that is transmitted by each antenna unit includes:

performing, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where the $(K-1)^{th}$ beam is a beam that is formed by the signals after $K-1^{th}$ adjustment processing, N≥2, and K is an integer greater than or equal to 2 and less than or equal to N; and when K is equal to N, the phase and the amplitude of the signal after the $K^{th}$ adjustment processing meet an $N^{th}$ iterative condition and meet the target preset condition.

Specifically, a width of a beam sent by the transmit antenna may be gradually adjusted to determine a direction of the antenna, and finally implement the antenna alignment. That is, adjustment processing is performed for N times on a phase and an amplitude of a signal that is transmitted by each antenna unit of the transmit antenna, that is, the first antenna, and when the phase and the amplitude of the signal after the $N^{th}$ adjustment processing meet the target preset condition, the iteration ends. The following describes the case in which N≥2.

In the first adjustment processing, the phase and the amplitude of the signal that is transmitted by each antenna unit of the transmit antenna, that is, the first antenna, are adjusted according to the first iterative condition, so that the signal that is transmitted by each antenna unit after the first adjustment processing on the first antenna is synthesized into the first beam. The width of the formed first beam, that is, the first width, should be wide enough, so that the receive antenna, that is, the second antenna, can receive the first beam, that is, it is ensured that the second antenna is located within the coverage scope of the first beam.

Methods for implementing the second adjustment processing to the $N^{th}$ adjustment processing are similar. The following provides a description by using the $K^{th}$ adjustment processing as an example. In the $K^{th}$ adjustment processing, the phase and the amplitude of the signal that is transmitted by each antenna unit of the transmit antenna, that is, the first antenna, are adjusted according to the $K^{th}$ iterative condition, so that the signal that is transmitted by each antenna unit after the $K^{th}$ adjustment processing on the first antenna is synthesized into the $K^{th}$ beam. The $K^{th}$ iterative condition includes: a width of a $K^{th}$ beam is a $K^{th}$ width, and the second antenna is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where K is an integer greater than or equal to 2 and less than or equal to N.

From another perspective, the $K^{th}$ adjustment processing is to adjust the transmit antenna from sending the $(K-1)^{th}$ beam to sending the $K^{th}$ beam whose width (the $K^{th}$ width) is smaller. According to feedback of the receive antenna, an angle of a signal of the $K^{th}$ beam is adjusted within a coverage scope of the $(K-1)^{th}$ beam, to make the $K^{th}$ beam aligned with the receive antenna. Although the width of the $K^{th}$ beam is smaller than the width of the $(K-1)^{th}$ beam, an adjustment range of an angle of the $K^{th}$ beam is limited, and therefore an alignment operation is relatively easy to implement.

When K is equal to N, the phase and the amplitude of the signal after the $K^{th}$ adjustment processing not only meet an $N^{th}$ iterative condition, but also meet the target preset condition.

It should be understood that, after the $(K-1)^{th}$ adjustment processing is performed, whether the $(K-1)^{th}$ beam formed by the signals that are transmitted by the multiple antenna units after the $(K-1)^{th}$ adjustment processing meets the target preset condition should be determined, that is, whether the width of the $(K-1)^{th}$ beam is less than or equal to the target width should be determined. If yes, the iteration ends, and S120 is performed; if not, the $K^{th}$ adjustment processing is performed.

In addition, for a case in which N=1, after the first adjustment processing is performed, whether the first beam formed by the signals that are transmitted by the multiple antenna units after the first adjustment processing meets the target preset condition is determined, that is, whether the width of the first beam is less than or equal to the target width is determined. If yes, the iteration ends, and S120 is performed; if not, the second adjustment processing is performed.

Optionally, in an embodiment, before the $K^{th}$ adjustment processing is performed, the method 100 may further include: adjusting a mechanical horizontal angle and a mechanical pitch angle of the second antenna, so that a power of the $(K-1)^{th}$ beam received by the second antenna is the maximum.

Optionally, in an embodiment, after the performing, according to a target preset condition, adjustment processing on a phase and an amplitude of a signal that is transmitted by each antenna unit, the method 100 may further include: adjusting a mechanical horizontal angle and a mechanical pitch angle of the second antenna, so that a power of the target beam received by the second antenna is the maximum.

While the phase and the amplitude of the signal that is transmitted by each antenna unit of the first antenna are adjusted, the mechanical horizontal angle and the mechanical pitch angle of the second antenna are adjusted at the same time, and this can implement the antenna alignment more quickly with higher alignment accuracy.

Therefore, by means of the method for antenna alignment in this embodiment of the present disclosure, a phase and an amplitude of a signal that is transmitted by each antenna unit of a transmit antenna are adjusted by means of multiple times of iteration, so that signals that are transmitted by multiple antenna units of the transmit antenna finally form a target beam whose width is less than or equal to a target width; moreover, the target beam covers a receive antenna, and a mechanical horizontal angle and a mechanical pitch angle of the transmit antenna are adjusted according to a direction of the target beam, so that the antenna alignment can be implemented more quickly with higher alignment accuracy.

Optionally, in an embodiment, before the $K^{th}$ adjustment processing is performed, the method 100 further includes:

adjusting the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

Specifically, in the multiple times of iteration by means of the method 100, each time a beam is determined, the mechanical horizontal angle and the mechanical pitch angle of the first antenna may be adjusted according to a difference between a horizontal angle of the beam and the horizontal angle of the current mechanical location of the first antenna and a difference between a pitch angle of the beam and the pitch angle of the current mechanical location of the first antenna, and this is not limited in this embodiment of the present disclosure.

Optionally, in an embodiment, the performing the $K^{th}$ adjustment processing includes:

adjusting, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, where a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$ and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \text{Re}\left\{\left(\tilde{c}_m - \frac{j\tilde{f}_w}{|f_w|^2}\text{Im}\{\tilde{c}_m f_w^*\}\right)(f_w - \tilde{f}_w)^*\right\} d\phi d\varphi \\ \theta_m^{(K)} = \theta_m^{(K-1)} + \\ 2h\mu \int_{\phi,\varphi} e^{h|f_w - \tilde{f}_w|^2} \text{Im}\left\{\left(c_m + \frac{\tilde{f}_w}{|f_w|^2}\text{Re}\{c_m f_w\}\right)(f_w - \tilde{f}_w)^*\right\} d\phi d\varphi \end{cases}$$

$$\tilde{c}_m = e^{j\left(\frac{2\pi}{\lambda} m d \sin\phi + \theta_m\right)} \quad c_m = r_m e^{j\left(\frac{2\pi}{\lambda} m d \sin\phi + \theta_m\right)}$$

$$f_w(\phi, \varphi) = \sum_{m=0}^{M-1} w_m e^{j\frac{2\pi}{\lambda}(x_m, y_m, z_m)\begin{pmatrix} \cos\varphi\sin\phi \\ \cos\varphi\cos\phi \\ -\sin\varphi \end{pmatrix}}$$

$$= \sum_{m=0}^{M-1} w_m e^{j\frac{2\pi}{\lambda}(x_m \cos\varphi\sin\phi - z_m \sin\varphi)}$$

$$\tilde{f}_w(\phi, \varphi) = A e^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m, y_m, z_m)$ is coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

Optionally, in an embodiment, in S110, before the performing, according to a target preset condition, adjustment processing on a phase and an amplitude of a signal that is transmitted by each antenna unit, the method 100 further includes:

obtaining location information of the first antenna and the second antenna that are to be aligned; and adjusting the mechanical horizontal angles and the mechanical pitch angles of the first antenna and the second antenna according to the location information.

The obtaining location information of the first antenna and the second antenna that are to be aligned may include: obtaining the location information, of the first antenna and the second antenna, obtained by means of triangulation or global positioning system (Global Positioning System, GPS) positioning. The obtaining location information of the first antenna and the second antenna that are to be aligned may include: obtaining the location information of the first antenna and the second antenna by using a data channel.

Specifically, the location information (such as altitude information and latitude and longitude information) of the transmit antenna and the receive antenna may be measured by means of the triangulation, the GPS or the like, and transmitted to the apparatus for antenna alignment by using communications means such as a walkie-talkie or a data channel. According to the location information of the transmit antenna and the receive antenna, directions of the antennas may be roughly adjusted, to facilitate a subsequent alignment operation.

FIG. 2 is a schematic flowchart of a method 200 for antenna alignment according to an embodiment of the present disclosure. The method 200 includes:

S210: Measure and transmit location information of a transmit antenna and a receive antenna, and roughly adjust, according to the location information of the transmit antenna and the receive antenna, directions of the antennas, to facilitate a subsequent alignment operation.

S220: Adjust a phase and an amplitude of a signal that is transmitted by each antenna unit of a first antenna, so that the first antenna generates an initial beam, and ensure that the initial beam can cover a second antenna.

S230: Adjust the phase and the amplitude of the signal that is transmitted by each antenna unit of the first antenna, so that the first antenna generates a next beam, where a width of the next beam is less than a width of a previous width, and a coverage scope of the next beam changes within a coverage scope of the previous beam, until the next beam can cover the second antenna.

S240: Determine whether the width of the beam generated in S230 is less than or equal to a target width. When the width of the beam generated in S230 is less than or equal to the target width, S250 is performed; when the width of the beam generated in S230 is greater than the target width, S230 and S240 are performed repeatedly to generate a beam whose width is smaller.

S250: Adjust a mechanical horizontal angle and a mechanical pitch angle of the first antenna (that is, adjust a mechanical location of the first antenna) according to a direction of the beam that meets the determining condition in S240 (that is, a difference between a horizontal angle of the beam that meets the determining condition in S240 and a horizontal angle of a current mechanical location of the first antenna, and a difference between a pitch angle of the beam that meets the determining condition in S240 and a pitch angle of the current mechanical location of the first antenna).

Figure 3:
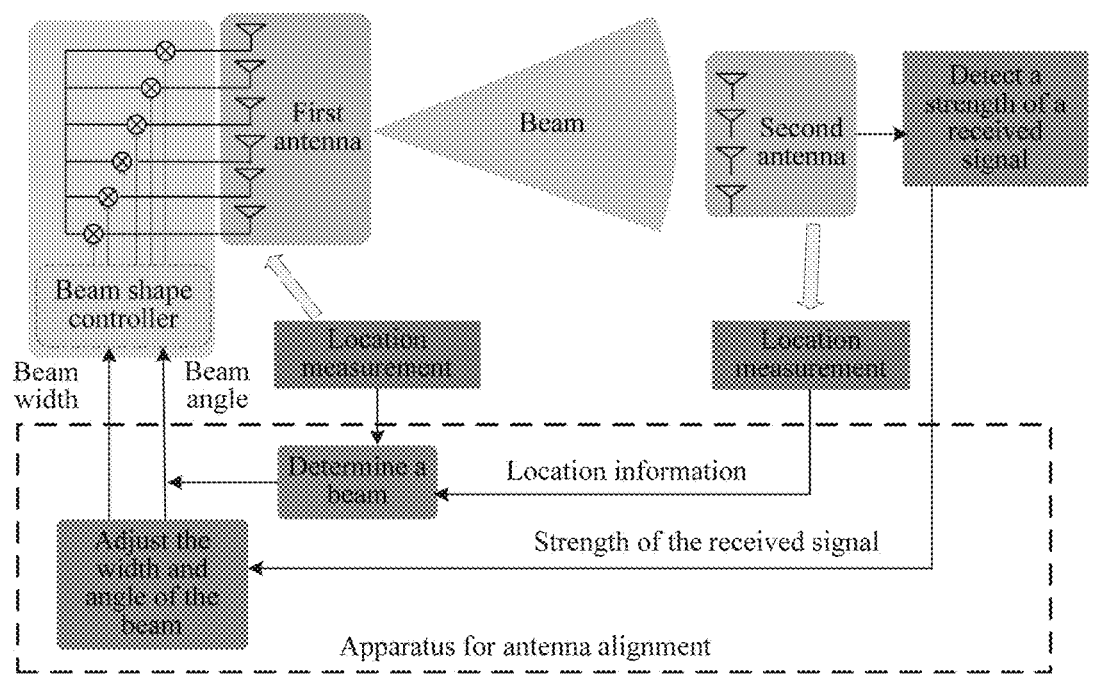
FIG. 3 is a schematic diagram of a system for antenna alignment according to an embodiment of the present disclosure.

FIG. 3 is a schematic diagram of a system for antenna alignment according to an embodiment of the present disclosure. As shown in FIG. 3, the system for antenna alignment includes a first antenna, where the first antenna includes multiple antenna units; a second antenna; an apparatus for antenna alignment, in communication connection with the first antenna, and in communication connection with the second antenna. The first antenna and the second antenna are configured to send a signal and receive the signal respectively. The first antenna receives information indicated by the apparatus for antenna alignment, and controls forming of a beam signal by using a beam shape controller, and sends the beam signal; the second antenna receives the beam signal, detects a strength of the received signal, and feeds back the strength to the apparatus for antenna alignment. Locations of the first antenna and the second antenna are measured by means of triangulation, a GPS, and the like, and the location information is fed back to the apparatus for antenna alignment. The apparatus for antenna alignment determines a width, an angle, or the like of the beam signal according to the location information of the first antenna and the second antenna, continuously adjusts the width and the angle of the beam signal according to the strength, of the received signal, fed back by the second antenna, and sends a calculation result to the first antenna. Information is transmitted among the first antenna, the second antenna, and the apparatus for antenna alignment by using data channels.

Figure 4:
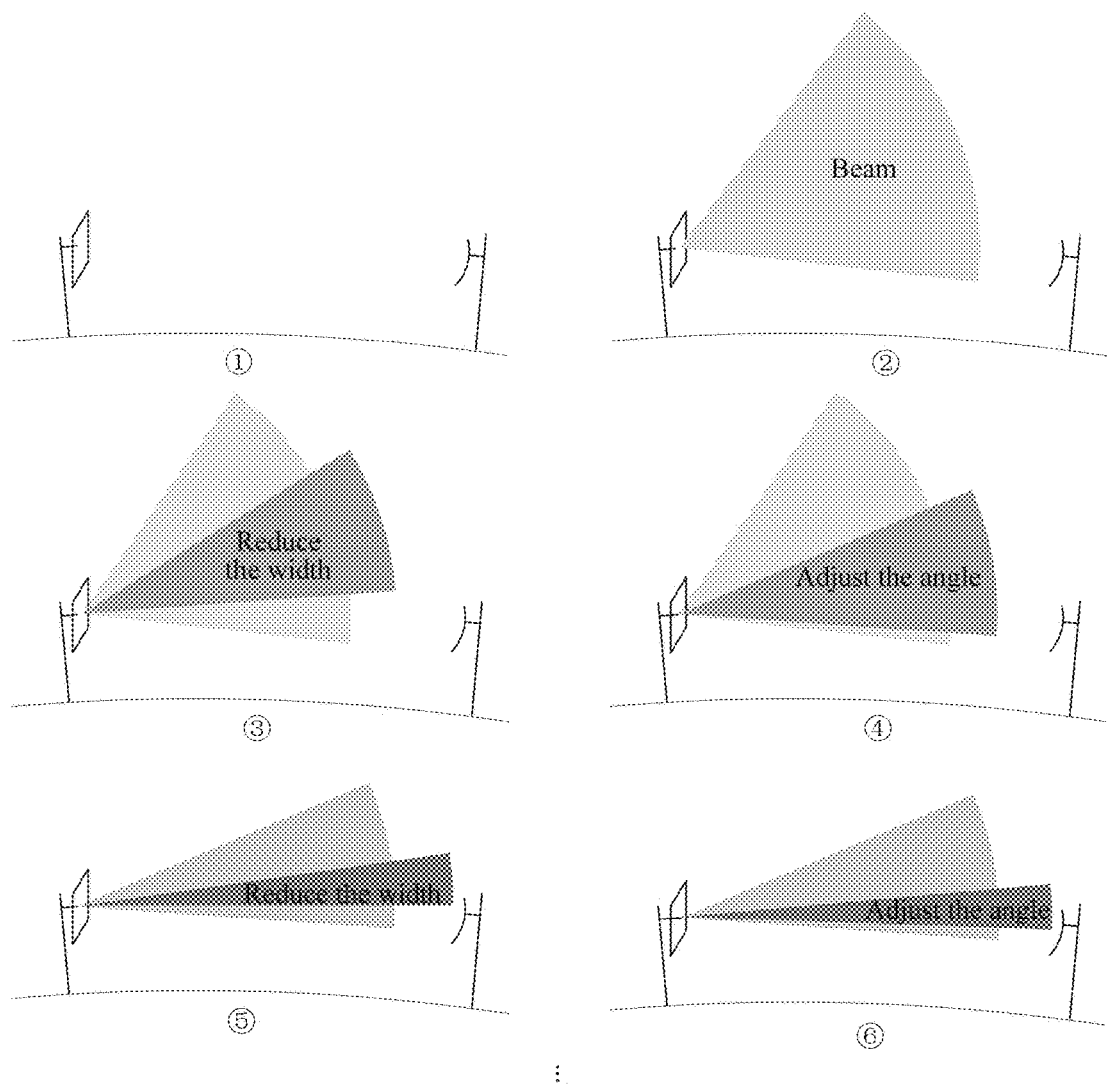
FIG. 4 is a schematic diagram of beam alignment according to an embodiment of the present disclosure.

FIG. 4 is a schematic diagram of beam alignment according to an embodiment of the present disclosure. As shown in FIG. 4, in ①, mechanical locations of a transmit antenna and a receive antenna are roughly adjusted according to location information of the transmit antenna and the receive antenna. In ②, the transmit antenna generates and sends a first beam, and ensures that the first beam can cover the receive antenna. In ③, the transmit antenna generates and sends a second beam, where a width of the second beam is less than a width of the first beam. In ④, an angle of the second beam is adjusted, so that the second beam can cover the receive antenna. In ⑤, the angle of the beam sent by the transmit antenna is further reduced, and in ⑥, the angle of the beam is adjusted, so that the beam can cover the receive antenna. In this way, beam alignment is not completed until the width of the beam is less than a target width, and then a mechanical location of the transmit antenna (a mechanical horizontal angle and a mechanical pitch angle of the transmit antenna) may be adjusted according to a direction of the beam (a difference between a horizontal angle of the beam and a horizontal angle of a current mechanical location of a first antenna and a difference between a pitch angle of the beam and a pitch angle of the current mechanical location of the first antenna).

The following describes the method 100 for antenna alignment in this embodiment of the present disclosure by using several specific examples.

In an example, the transmit antenna is a uniform linear array antenna, and an antenna array has 64 antenna units. The receive antenna is an antenna of any type. Therefore, a specific process of performing antenna alignment by the apparatus for antenna alignment is as follows:

1. Measure location information (altitudes as well as latitudes and longitudes) of the transmit antenna and the receive antenna by using a GPS, and roughly adjust mechanical locations (mechanical horizontal angles and mechanical pitch angles) of the transmit antenna and the receive antenna according to the location information.

2. Instruct the transmit antenna to generate a beam whose coverage scope is 120 degrees. For a generation method, refer to the foregoing formulas. Coefficients are as follows:

amplitudes of signals generated by antenna units (the width is 120 degrees):

0.529, 0.550, 0.112, 0.544, 0.719, 0.087, 0.426, 0.791, 0.599, 0.428, 1.000, 0.990, 0.495, 0.672, 0.991, 0.304, 1.000, 0.870, 0.852, 0.312, 0.559, 1.000, 0.943, 0.534, 1.000, 0.947, 0.605, 1.000, 1.000, 0.623, 1.000, 0.681, 0.605, 1.000, 1.000, 0.148, 1.000, 1.000, 0.360, 1.000, 1.000, 1.000, 1.000, 0.373, 1.000, 1.000, 1.000, 0.941, 0.614, 1.000, 0.571, 0.910, 0.353, 0.990, 1.000, 0.482, 0.881, 1.000, 0.494, 1.000, 0.868, 0.305, 0.913, 0.339 phases of signals generated by antenna units (the width is 120 degrees):

−127.00, −31.26, 137.58, −135.67, −50.53, −117.26, −66.88, −98.42, −35.14, −129.87, −143.79, −69.80, −172.70, −137.84, −102.40, 173.83, −127.92, −126.97, −33.75, 103.63, 138.16, −52.44, 62.39, 14.67, 32.16, 85.89, −66.71, 73.52, −150.83, −94.33, 70.82, 173.77, −165.54, −86.27, −60.98, 26.63, 136.58, 149.12, −14.73, 65.97, 26.18, −41.86, −155.18, −32.80, −116.31, 177.78, 25.73, −70.63, 79.88, 79.62, 136.32, 138.98, −115.97, −46.14, −64.34, −130.49, 115.10, 34.55, −61.96, −158.35, 135.32, 75.34, −16.21, −111.59

3. Indicate and feedback a signal strength, of the 120-degree beam, measured by the receive antenna. The apparatus for antenna alignment instructs the transmit antenna to adjust a direction of the beam according to the signal strength measured by the receive antenna, to ensure that the beam can cover the receive antenna. The beam is relatively wide in this case, and therefore is relatively easy to cover the receive antenna.

4. The apparatus for antenna alignment instructs the transmit antenna to reduce a width of a to-be-sent beam to 60 degrees and generate the beam. For a generation method, refer to the foregoing formulas. Coefficients are as follows:

amplitudes of signals generated by the antenna units (the width is 60 degrees):

0.482, 0.251, 0.583, 0.800, 0.593, 0.633, 0.758, 1.000, 1.000, 0.921, 1.000, 1.000, 0.906, 0.249, 0.775, 1.000, 0.842, 0.341, 1.000, 1.000, 1.000, 1.000, 1.000, 1.000, 1.000, 1.000, 1.000, 0.763, 0.233, 0.702, 1.000, 0.788, 1.000, 1.000, 1.000, 1.000, 0.774, 1.000, 1.000, 0.439, 1.000, 1.000, 0.588, 0.816, 0.495, 1.000, 1.000, 1.000, 1.000, 1.000, 0.413, 0.303, 0.118, 1.000, 0.874, 0.766, 0.933, 0.343, 0.775, 0.347, 1.000, 0.796, 0.743, 0.688 phases of signals generated by the antenna units (the width is 60 degrees):

91.23, 97.24, −106.75, −126.35, 177.40, 114.78, 65.34, 31.98, 14.29, −23.43, −66.28, −100.11, −133.42, 156.65, 27.21, 15.03, 7.57, −109.49, −129.99, −105.01, −77.64, −76.90, −100.29, −139.37, −165.46, −155.37, −138.19, −131.32, −111.43, −43.67, −51.61, −22.04, 57.86, 43.93, −54.97, −83.23, −79.01, 48.98, 36.85, 0.98, −168.76, 167.95, 107.26, 36.86, 105.76, 171.76, −150.03, −70.88, −14.47, 28.90, 40.46, −65.31, 52.78, 106.21, 131.87, −125.65, −100.29, 164.39, 130.57, −130.88, −72.44, −33.94, 55.64, 82.31

5. Instruct the receive antenna to measure and feed back a signal strength of the 60-degree beam. The apparatus for antenna alignment instructs the transmit antenna to adjust a direction of the beam according to the signal strength measured by the receive antenna, to ensure that the beam can cover the receive antenna. Although the beam is relatively narrow in this case, an adjustment range of an angle of the beam is limited, where the angle is adjusted only within the range of the foregoing 120 degrees. Therefore, an alignment operation is also relatively easy.

6. Repeat the foregoing process 5, to successively generate beams whose widths are 30 degrees, 15 degrees, and 5 degrees. Coefficients are as follows:

amplitudes of signals generated by the antenna units (the width is 30 degrees):

1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 0.815, 1.000, 1.000, 0.637, 1.000, 1.000, 1.000, 0.691, 1.000 phases of signals generated by the antenna units (the width is 30 degrees):

84.12, 62.81, 34.71, −9.08, −44.37, −64.68, −84.19, 115.26, 94.61, 76.83, 38.94, −19.65, −47.70, −60.45, −69.69, −82.21, −115.87, −172.28, −179.48, −147.19, −110.28, −94.95, −89.54, −89.40, −96.27, −116.45, −137.11, −135.63, −123.11, −109.83, −93.87, −36.89, 40.02, 49.90, 44.23, 22.83, −10.72, −32.12, −39.30, −38.45, −30.67, 11.76, 142.60, 161.55, 175.61, −172.30, −161.73, −150.58, −117.93, 1.11, 14.84, 17.25, 15.85, 11.27, 2.67, 19.94, 144.41, 115.75, 135.19, −98.37, −111.55, −119.62, 111.00, 54.51 amplitudes of signals generated by the antenna units (the width is 15 degrees):

1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000 phases of signals generated by the antenna units (the width is 15 degrees):

49.01, −6.88, −22.82, −42.08, −67.54, −93.16, −112.52, −126.10, −136.61, −146.36, −157.56, −173.27, 162.15, 129.47, 101.76, 84.32, 73.31, 65.47, 58.98, 52.68, 45.51, 36.13, 22.83, 4.76, −14.22, −26.38, −27.10, −14.83, 6.41, 24.50, 34.53, 38.67, 38.67, 34.53, 24.50, 6.41, −14.83, −27.10, −26.38, −14.22, 4.76, 22.83, 36.13, 45.51, 52.68, 58.98, 65.47, 73.31, 84.32, 101.76, 129.47, 162.15, −173.27, −157.56, −146.36, −136.61, −126.10, −112.52, −93.16, −67.54, −42.08, −22.82, −6.88, 49.01 amplitudes of signals generated by the antenna units (the width is 5 degrees):

1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000 phases of signals generated by the antenna units (the width is 5 degrees):

98.30, 80.91, 62.21, 45.48, 32.25, 22.10, 14.07, 7.30, 1.19, −4.70, −10.68, −17.00, −23.84, −31.29, −39.35, −47.87, −56.59, −65.14, −73.19, −80.49, −86.91, −92.43, −97.11, −101.01, −104.24, −106.88, −109.02, −110.71, −112.00, −112.94, −113.55, −113.85, −113.85, −113.55, −112.94, −112.00, −110.71, −109.02, −106.88, −104.24, −101.01, −97.10, −92.43, −86.91, −80.49, −73.18, −65.13, −56.58, −47.87, −39.35, −31.29, −23.84, −17.00, −10.68, −4.69, 1.19, 7.30, 14.07, 22.10, 32.24, 45.47, 62.20, 80.91, 98.30

7. Adjust a mechanical location of the transmit antenna (a mechanical horizontal angle and a mechanical pitch angle of the transmit antenna) according to a direction of the beam whose width is 5 degrees (a difference between a horizontal angle of the beam and a horizontal angle of a current mechanical location of a first antenna and a difference between a pitch angle of the beam and a pitch angle of the current mechanical location of the first antenna).

Optionally, in an embodiment, after completing the foregoing operations 1 to 7, the original receive antenna is used as a transmit antenna, and the original transmit antenna is used as a receive antenna, to repeat the foregoing operations 1 to 7.

Optionally, in an embodiment, before the $K^{th}$ adjustment processing is performed, the method 100 may further include: adjusting a mechanical horizontal angle and a mechanical pitch angle of the second antenna, so that a power of the $(K-1)^{th}$ beam received by the second antenna is the maximum.

According to this embodiment of the present disclosure, in an example, the transmit antenna is a uniform linear array antenna, and an antenna array has 64 antenna units. The receive antenna is an antenna of any type. Therefore, a specific process of performing antenna alignment by the apparatus for antenna alignment is as follows:

1. Measure location information (altitudes as well as latitudes and longitudes) of the transmit antenna and the receive antenna by using a GPS, and roughly adjust mechanical locations (mechanical horizontal angles and mechanical pitch angles) of the transmit antenna and the receive antenna according to the location information.

2. Instruct the transmit antenna to generate a beam signal whose coverage scope is 120 degrees. For a generation method, refer to the foregoing formulas. Coefficients are as follows:

amplitudes of signals generated by antenna units (the width is 120 degrees):

0.529, 0.550, 0.112, 0.544, 0.719, 0.087, 0.426, 0.791, 0.599, 0.428, 1.000, 0.990, 0.495, 0.672, 0.991, 0.304, 1.000, 0.870, 0.852, 0.312, 0.559, 1.000, 0.943, 0.534, 1.000, 0.947, 0.605, 1.000, 1.000, 0.623, 1.000, 0.681, 0.605, 1.000, 1.000, 0.148, 1.000, 1.000, 0.360, 1.000, 1.000, 1.000, 1.000, 0.373, 1.000, 1.000, 1.000, 0.941, 0.614, 1.000, 0.571, 0.910, 0.353, 0.990, 1.000, 0.482, 0.881, 1.000, 0.494, 1.000, 0.868, 0.305, 0.913, 0.339 phases of signals generated by the antenna units (the width is 120 degrees):

−127.00, −31.26, 137.58, −135.67, −50.53, −117.26, −66.88, −98.42, −35.14, −129.87, −143.79, −69.80, −172.70, −137.84, −102.40, 173.83, −127.92, −126.97, −33.75, 103.63, 138.16, −52.44, 62.39, 14.67, 32.16, 85.89, −66.71, 73.52, −150.83, −94.33, 70.82, 173.77, −165.54, −86.27, −60.98, −26.63, 136.58, 149.12, −14.73, 65.97, 26.18, −41.86, −155.18, −32.80, −116.31, 177.78, 25.73, −70.63, 79.88, 79.62, 136.32, 138.98, −115.97, −46.14, −64.34, −130.49, 115.10, 34.55, −61.96, −158.35, 135.32, 75.34, −16.21, −111.59

3. Indicate and feedback a signal strength, of the 120-degree beam, measured by the receive antenna. The apparatus for antenna alignment instructs the transmit antenna to adjust a direction of the beam according to the signal strength measured by the receive antenna, to ensure that the beam can cover the receive antenna. The beam is relatively wide in this case, and therefore is relatively easy to cover the receive antenna. After the receive antenna is covered, the apparatus for antenna alignment instructs to adjust a direction of the receive antenna (the mechanical horizontal angle and the mechanical pitch angle of the receive antenna), so that a receive power of the receive antenna is the maximum.

4. The apparatus for antenna alignment instructs the transmit antenna to reduce a width of a to-be-sent beam to 60 degrees and generate the beam. For a generation method, refer to the foregoing formulas. Coefficients are as follows:

amplitudes of signals generated by the antenna units (the width is 60 degrees):

0.482, 0.251, 0.583, 0.800, 0.593, 0.633, 0.758, 1.000, 1.000, 0.921, 1.000, 1.000, 0.906, 0.249, 0.775, 1.000, 0.842, 0.341, 1.000, 1.000, 1.000, 1.000, 1.000, 1.000, 1.000, 1.000, 1.000, 0.763, 0.233, 0.702, 1.000, 0.788, 1.000, 1.000, 1.000, 1.000, 0.774, 1.000, 1.000, 0.439, 1.000, 1.000, 0.588, 0.816, 0.495, 1.000, 1.000, 1.000, 1.000, 1.000, 0.413, 0.303, 0.118, 1.000, 0.874, 0.766, 0.933, 0.343, 0.775, 0.347, 1.000, 0.796, 0.743, 0.688 phases of signals generated by the antenna units (the width is 60 degrees):

91.23, 97.24, −106.75, −126.35, 177.40, 114.78, 65.34, 31.98, 14.29, −23.43, −66.28, −100.11, −133.42, 156.65, 27.21, 15.03, 7.57, −109.49, −129.99, −105.01, −77.64, −76.90, −100.29, −139.37, −165.46, −155.37, −138.19, −131.32, −111.43, −43.67, −51.61, −22.04, 57.86, 43.93,

−54.97, −83.23, −79.01, 48.98, 36.85, 0.98, −168.76, 167.95, 107.26, 36.86, 105.76, 171.76, −150.03, −70.88, −14.47, 28.90, 40.46, −65.31, 52.78, 106.21, 131.87, −125.65, −100.29, 164.39, 130.57, −130.88, −72.44, −33.94, 55.64, 82.31

5. Instruct the receive antenna to measure and feed back a signal strength of the 60-degree beam. The apparatus for antenna alignment instructs the transmit antenna to adjust a direction of the beam according to the signal strength measured by the receive antenna, to ensure that the beam can cover the receive antenna. Although the beam is relatively narrow in this case, an adjustment range of an angle of the beam is limited, where the angle is adjusted only within the range of the foregoing 120 degrees. Therefore, an alignment operation is also relatively easy. After the receive antenna is covered, the apparatus for antenna alignment instructs to adjust a direction of the receive antenna (the mechanical horizontal angle and the mechanical pitch angle of the receive antenna), so that a receive power of the receive antenna is the maximum.

6. Repeat the foregoing process 5, to successively generate beams whose widths are 30 degrees, 15 degrees, and 5 degrees. Coefficients are as follows:

amplitudes of signals generated by the antenna units (the width is 30 degrees):

1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 0.815, 1.000, 1.000, 0.637, 1.000, 1.000, 1.000, 0.691, 1.000 phases of signals generated by the antenna units (the width is 30 degrees):

84.12, 62.81, 34.71, −9.08, −44.37, −64.68, −84.19, 115.26, 94.61, 76.83, 38.94, −19.65, −47.70, −60.45, −69.69, −82.21, −115.87, −172.28, −179.48, −147.19, −110.28, −94.95, −89.54, −89.40, −96.27, −116.45, −137.11, −135.63, −123.11, −109.83, −93.87, −36.89, 40.02, 49.90, 44.23, 22.83, −10.72, −32.12, −39.30, −38.45, −30.67, 11.76, 142.60, 161.55, 175.61, −172.30, −161.73, −150.58, −117.93, 1.11, 14.84, 17.25, 15.85, 11.27, 2.67, 19.94, 144.41, 115.75, 135.19, −98.37, −111.55, −119.62, 111.00, 54.51 amplitudes of signals generated by the antenna units (the width is 15 degrees):

1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000 phases of signals generated by the antenna units (the width is 15 degrees):

49.01, −6.88, −22.82, −42.08, −67.54, −93.16, −112.52, −126.10, −136.61, −146.36, −157.56, −173.27, 162.15, 129.47, 101.76, 84.32, 73.31, 65.47, 58.98, 52.68, 45.51, 36.13, 22.83, 4.76, −14.22, −26.38, −27.10, −14.83, 6.41, 24.50, 34.53, 38.67, 38.67, 34.53, 24.50, 6.41, −14.83, −27.10, −26.38, −14.22, 4.76, 22.83, 36.13, 45.51, 52.68, 58.98, 65.47, 73.31, 84.32, 101.76, 129.47, 162.15, −173.27, −157.56, −146.36, −136.61, −126.10, −112.52, −93.16, −67.54, −42.08, −22.82, −6.88, 49.01 amplitudes of signals generated by the antenna units (the width is 5 degrees):

1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000, 1.000 phases of signals generated by the antenna units (the width is 5 degrees):

98.30, 80.91, 62.21, 45.48, 32.25, 22.10, 14.07, 7.30, 1.19, −4.70, −10.68, −17.00, −23.84, −31.29, −39.35, −47.87, −56.59, −65.14, −73.19, −80.49, −86.91, −92.43, −97.11, −101.01, −104.24, −106.88, −109.02, −110.71, −112.00, −112.94, −113.55, −113.85, −113.85, −113.55, −112.94, −112.00, −110.71, −109.02, −106.88, −104.24, −101.01, −97.10, −92.43, −86.91, −80.49, −73.18, −65.13, −56.58, −47.87, −39.35, −31.29, −23.84, −17.00, −10.68, −4.69, 1.19, 7.30, 14.07, 22.10, 32.24, 45.47, 62.20, 80.91, 98.30

7. Adjust a mechanical location of the transmit antenna (a mechanical horizontal angle and a mechanical pitch angle of the transmit antenna) according to a direction of the beam whose width is 5 degrees (a difference between a horizontal angle of the beam and a horizontal angle of a current mechanical location of a first antenna and a difference between a pitch angle of the beam and a pitch angle of the current mechanical location of the first antenna).

Figure 5:
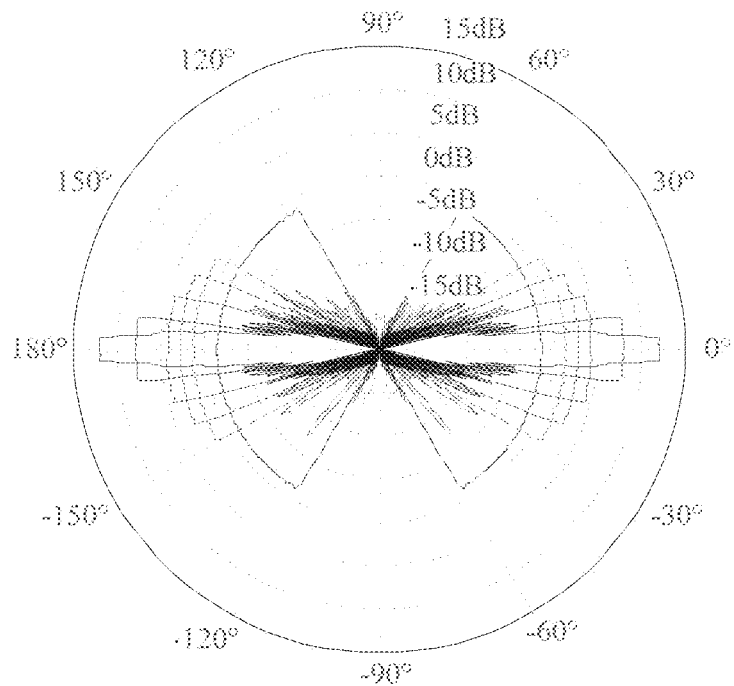
FIG. 5 is a diagram of directions of antennas that are aligned after a method for antenna alignment according to an embodiment of the present disclosure is applied.

FIG. 5 is a diagram of directions of antennas that are aligned after a method for antenna alignment according to an embodiment of the present disclosure is applied. It can be seen from FIG. 5 that, after the antenna alignment, an antenna may perform transmission with a full power or nearly full power, and within a width of a beam sent by the antenna, signal powers are evenly distributed, and beam sidelobe is small. In addition, the method for antenna alignment in this embodiment of the present disclosure may be used for antennas in multiple forms such as a uniform linear array and a uniform planar array, and can implement convenient and quick antenna alignment with high accuracy.

Therefore, by means of the method for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

In the foregoing, the method for antenna alignment according to embodiments of the present disclosure is described in detail with reference to FIG. 1 to FIG. 5. In the following, an apparatus, a device, and a system for antenna alignment according to embodiments of the present disclosure are described in detail with reference to FIG. 6.

Figure 6:
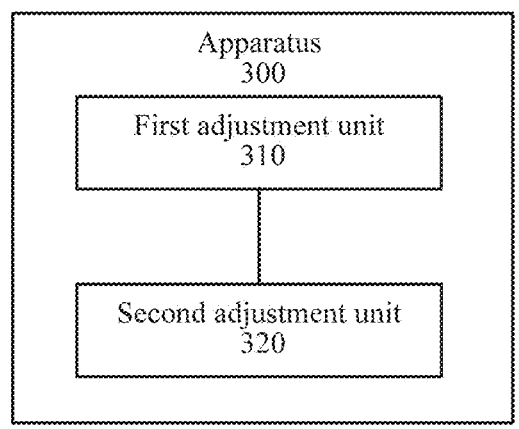
FIG. 6 is a schematic block diagram of an apparatus for antenna alignment according to an embodiment of the present disclosure.

FIG. 6 is a schematic block diagram of an apparatus 300 for antenna alignment according to an embodiment of the present disclosure. The apparatus 300 is in communication connection with a first antenna, and is in communication connection with a second antenna. As shown in FIG. 6, the apparatus 300 includes:

a first adjustment unit 310, configured to perform, according to a target preset condition, adjustment processing on a phase and an amplitude of a signal that is transmitted by each antenna unit of the first antenna, where the target preset condition includes: a width of a target beam is less than or equal to a target width, and the second antenna is located within a coverage scope of the target beam, where the target beam is a beam formed by signals that are transmitted by multiple antenna units of the first antenna after the adjustment processing; and a second adjustment unit 320, configured to determine that a difference between a horizontal angle of the target beam and a mechanical horizontal angle of a current mechanical location of the first antenna is a horizontal angle, that needs to be adjusted, of the first antenna, determine that a difference between a pitch angle of the target beam and a mechanical pitch angle of the current mechanical location of the first antenna is a pitch angle, that needs to be adjusted, of the first antenna, and adjust the mechanical horizontal angle and the mechanical pitch angle of the first antenna according to the horizontal angle that needs to be adjusted and the pitch angle that needs to be adjusted.

Therefore, by means of the apparatus for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

Optionally, in an embodiment, the apparatus 300 further includes:

a third adjustment unit, configured to: after the adjustment processing is performed, according to the target preset condition, on the phase and the amplitude of the signal that is transmitted by each antenna unit, adjust a mechanical horizontal angle and a mechanical pitch angle of the second antenna, so that a power of the target beam received by the second antenna is the maximum.

Optionally, in an embodiment, the first adjustment unit 310 is specifically configured to:

perform, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where the $(K-1)^{th}$ beam is a beam that is formed by the signals after $K-1^{th}$ adjustment processing, $N \geq 2$, and K is an integer greater than or equal to 2 and less than or equal to N; and when K is equal to N, the phase and the amplitude of the signal after the $K^{th}$ adjustment processing meet an $N^{th}$ iterative condition and meet the target preset condition.

Optionally, in an embodiment, before performing the $K^{th}$ adjustment processing, the first adjustment unit 310 is further configured to:

adjust a mechanical horizontal angle and a mechanical pitch angle of the second antenna, so that a power of the $(K-1)^{th}$ beam received by the second antenna is the maximum.

Optionally, in an embodiment, before performing the $K^{th}$ adjustment processing, the first adjustment unit 310 is further configured to:

adjust the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

Optionally, in an embodiment, the performing, by the first adjustment unit 310, the $K^{th}$ adjustment processing includes:

adjusting, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, where a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$, and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \mathrm{Re}\left\{ \left( \tilde{c}_m - \frac{j\tilde{f}_w}{|f_w|^2} \mathrm{Im}\{\tilde{c}_m f_w^*\} \right)(f_w - \tilde{f}_w)^* \right\} d\phi d\varphi \\ \theta_m^{(K)} = \theta_m^{(K-1)} + \\ 2h\mu \int_{\phi,\varphi} e^{h|f_w - \tilde{f}_w|^2} \mathrm{Im}\left\{ \left( c_m + \frac{\tilde{f}_w}{|f_w|^2} \mathrm{Re}\{c_m f_w\} \right)(f_w - \tilde{f}_w)^* \right\} d\phi d\varphi \end{cases}$$

$$\tilde{c}_m = e^{j\left(\frac{2\pi}{\lambda} m d \sin\phi + \theta_m\right)} \quad c_m = r_m e^{j\left(\frac{2\pi}{\lambda} m d \sin\phi + \theta_m\right)}$$

$$f_w(\phi, \varphi) = \sum_{m=0}^{M-1} w_m e^{j\frac{2\pi}{\lambda}(x_m, y_m, z_m)\begin{pmatrix} \cos\varphi\sin\phi \\ \cos\varphi\cos\phi \\ -\sin\varphi \end{pmatrix}}$$

$$= \sum_{m=0}^{M-1} w_m e^{j\frac{2\pi}{\lambda}(x_m \cos\varphi\sin\phi - z_m \sin\varphi)}$$

$$\tilde{f}_w(\phi, \varphi) = A e^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m, y_m, z_m)$ is coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

Optionally, in an embodiment, the target width is five degrees.

Optionally, in an embodiment, the apparatus 300 further includes:

an obtaining unit, configured to: before the adjustment processing is performed, according to the target preset condition, on the phase and the amplitude of the signal that is transmitted by each antenna unit, obtain location information of the first antenna and the second antenna that are to be aligned; and a fourth adjustment unit, configured to adjust the mechanical horizontal angles and the mechanical pitch angles of the first antenna and the second antenna according to the location information.

Optionally, in an embodiment, the obtaining unit is specifically configured to:

obtain the location information, of the first antenna and the second antenna, obtained by means of triangulation or global positioning system GPS positioning.

Therefore, by means of the apparatus for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

Figure 7:
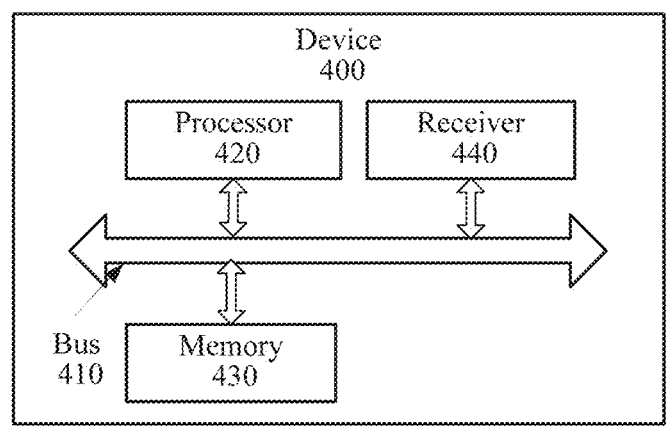
FIG. 7 is a schematic block diagram of a device for antenna alignment according to an embodiment of the present disclosure.

FIG. 7 shows a schematic block diagram of a device 400 for antenna alignment according to an embodiment of the present disclosure. The device 400 is in communication connection with a first antenna, and is in communication connection with a second antenna. As shown in FIG. 7, the device 400 includes:

a bus 410;

a processor 420 connected to the bus 410; and a memory 430 connected to the bus 410, where the processor 420 invokes, by using the bus 410, a program stored in the memory 430, to perform, according to a target preset condition, adjustment processing on a phase and an amplitude of a signal that is transmitted by each antenna unit of the first antenna, where the target preset condition includes: a width of a target beam is less than or equal to a target width, and the second antenna is located within a coverage scope of the target beam, where the target beam is a beam formed by signals that are transmitted by multiple antenna units of the first antenna after the adjustment processing; and determine that a difference between a horizontal angle of the target beam and a mechanical horizontal angle of a current mechanical location of the first antenna is a horizontal angle, that needs to be adjusted, of the first antenna, determine that a difference between a pitch angle of the target beam and a mechanical pitch angle of the current mechanical location of the first antenna is a pitch angle, that needs to be adjusted, of the first antenna, and adjust the mechanical horizontal angle and the mechanical pitch angle of the first antenna according to the horizontal angle that needs to be adjusted and the pitch angle that needs to be adjusted.

Therefore, by means of the device for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

It should be understood that in this embodiment of the present disclosure, the processor 420 may be a central processing unit (Central Processing Unit, CPU), or the processor 420 may be another general purpose processor, a digital signal processor (Digital Signal Processor, DSP), an application-specific integrated circuit (Application Specific Integrated Circuit, ASIC), a field-programmable gate array (Field-Programmable Gate Array, FPGA), or another programmable logic device, discrete gate or transistor logic device, discrete hardware component, or the like. The general purpose processor may be a microprocessor or the processor may be any conventional processor or the like.

The memory 430 may include a read-only memory and a random access memory, and provides an instruction and data to the processor 420. Apart of the memory 430 may further include a non-volatile random access memory. For example, the memory 430 may further store device type information.

The bus 410 includes a data bus, and may further include a power bus, a control bus, a status signal bus, or the like. However, for clear description, various buses are marked as the bus 410 in the figure.

In an implementation process, the steps of the foregoing method may be completed by using an integrated logical circuit of hardware in the processor 420 or an instruction in a form of software. Steps of the method disclosed with reference to the embodiments of the present disclosure may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 430, and the processor 420 reads information in the memory 430 and completes the steps of the foregoing method in combination with hardware of the processor 420. To avoid repetition, details are not described herein again.

Optionally, in an embodiment, the processor 420 is further configured to: after performing, according to the target preset condition, the adjustment processing on the phase and the amplitude of the signal that is transmitted by each antenna unit, adjust a mechanical horizontal angle and a mechanical pitch angle of the second antenna, so that a power of the target beam received by the second antenna is the maximum.

Optionally, in an embodiment, the processor 420 is specifically configured to:

perform, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where the $(K-1)^{th}$ beam is a beam that is formed by the signals after $K-1^{th}$ adjustment processing, $N \geq 2$, and K is an integer greater than or equal to 2 and less than or equal to N; and when K is equal to N, the phase and the amplitude of the signal after the $K^{th}$ adjustment processing meet an $N^{th}$ iterative condition and meet the target preset condition.

Optionally, in an embodiment, the processor 420 is specifically configured to:

before performing the $K^{th}$ adjustment processing, adjust a mechanical horizontal angle and a mechanical pitch angle of the second antenna, so that a power of the $(K-1)^{th}$ beam received by the second antenna is the maximum.

Optionally, in an embodiment, the processor 420 is specifically configured to:

before performing the $K^{th}$ adjustment processing, adjust the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

Optionally, in an embodiment, the performing, by the processor 420, the $K^{th}$ adjustment processing includes:

adjusting, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, where a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$ and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \mathrm{Re}\left\{\left(\tilde{c}_m - \frac{j\tilde{f}_w}{|f_w|^2}\mathrm{Im}\{\tilde{c}_m f_w^*\}\right)(f_w - \tilde{f}_w)^*\right\}d\phi d\varphi \\ \theta_m^{(K)} = \theta_m^{(K-1)} + \\ 2h\mu \int_{\phi,\varphi} e^{h|f_w - \tilde{f}_w|^2} \mathrm{Im}\left\{\left(c_m + \frac{\tilde{f}_w}{|f_w|^2}\mathrm{Re}\{c_m f_w\}\right)(f_w - \tilde{f}_w)^*\right\}d\phi d\varphi \end{cases}$$

$$\tilde{c}_m = e^{j\left(\frac{2\pi}{\lambda}mdsin\phi + \theta_m\right)} \quad c_m = r_m e^{j\left(\frac{2\pi}{\lambda}mdsin\phi + \theta_m\right)}$$

$$f_w(\phi, \varphi) = \sum_{m=0}^{M-1} w_m e^{j\frac{2\pi}{\lambda}(x_m, y_m, z_m)\begin{pmatrix}cos\varphi sin\phi\\cos\varphi cos\phi\\-sin\varphi\end{pmatrix}}$$

$$= \sum_{m=0}^{M-1} w_m e^{j\frac{2\pi}{\lambda}(x_m cos\varphi sin\phi - z_m sin\varphi)}$$

$$\tilde{f}_w(\phi, \varphi) = A e^{jarg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m,y_m,z_m)$ is coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

Optionally, in an embodiment, the target width is five degrees.

Optionally, in an embodiment, the device 400 further includes:

a receiver 440, configured to: before the adjustment processing is performed, according to the target preset condition, on the phase and the amplitude of the signal that is transmitted by each antenna unit, obtain location information of the first antenna and the second antenna that are to be aligned; and the processor 420 is further configured to:

adjust the mechanical horizontal angles and the mechanical pitch angles of the first antenna and the second antenna according to the location information.

Optionally, in an embodiment, the receiver 440 is specifically configured to:

obtain the location information, of the first antenna and the second antenna, obtained by means of triangulation or global positioning system GPS positioning.

Therefore, by means of the device for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

Figure 8:
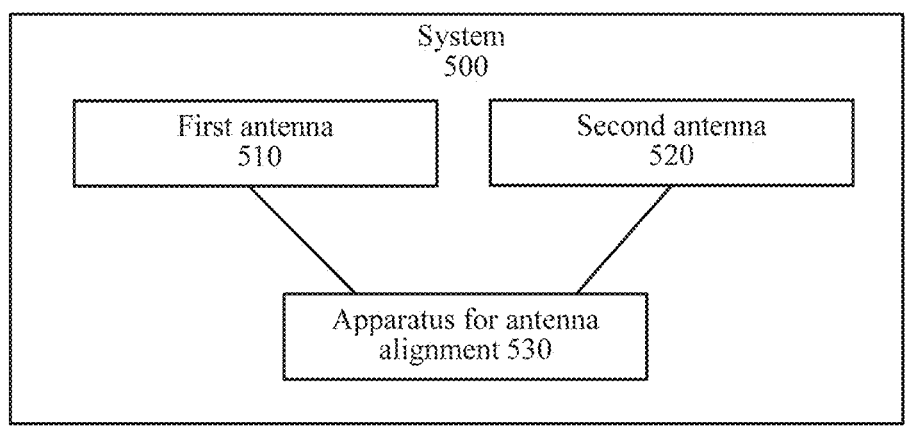
FIG. 8 is a schematic block diagram of a system for antenna alignment according to an embodiment of the present disclosure.

FIG. 8 is a schematic block diagram of a system 500 for antenna alignment according to an embodiment of the present disclosure. As shown in FIG. 8, the system 500 includes:

a first antenna 510, including multiple antenna units;

a second antenna 520; and an apparatus 530 for antenna alignment, in communication connection with the first antenna 510, in communication connection with the second antenna 520, and configured to perform, according to a target preset condition, adjustment processing on a phase and an amplitude of a signal that is transmitted by each antenna unit of the first antenna, where the target preset condition includes: a width of a target beam is less than or equal to a target width, and the second antenna 520 is located within a coverage scope of the target beam, where the target beam is a beam formed by signals that are transmitted by the multiple antenna units of the first antenna after the adjustment processing; and configured to determine that a difference between a horizontal angle of the target beam and a mechanical horizontal angle of a current mechanical location of the first antenna 510 is a horizontal angle, that needs to be adjusted, of the first antenna 510, determine that a difference between a pitch angle of the target beam and a mechanical pitch angle of the current mechanical location of the first antenna 510 is a pitch angle, that needs to be adjusted, of the first antenna 510, and adjust the mechanical horizontal angle and the mechanical pitch angle of the first antenna 510 according to the horizontal angle that needs to be adjusted and the pitch angle that needs to be adjusted.

Therefore, by means of the system for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, The target beam covers a receive antenna, and a mechanical horizontal angle and a mechanical pitch angle of the transmit antenna are adjusted according to a direction of the target beam, so that convenient and quick antenna alignment with high accuracy can be implemented.

Optionally, in an embodiment, the apparatus 530 for antenna alignment is further configured to:

after performing, according to the target preset condition, the adjustment processing on the phase and the amplitude of the signal that is transmitted by each antenna unit, adjust a mechanical horizontal angle and a mechanical pitch angle of the second antenna 520, so that a power of the target beam received by the second antenna 520 is the maximum.

Optionally, in an embodiment, the performing, by the apparatus 530 for antenna alignment, according to a target preset condition, adjustment processing on a phase and an amplitude of a signal that is transmitted by each antenna unit includes:

performing, according to N iterative conditions, N times of adjustment processing on the phase and the amplitude of the signal that is transmitted by each antenna unit, where a phase and an amplitude of the signal after first adjustment processing meet a first iterative condition, and the first iterative condition includes: a width of a first beam is a first width, and the second antenna 520 is located within a coverage scope of the first beam, where the first beam is a beam that is formed by the signals after the first adjustment processing;

a phase and an amplitude of the signal after $K^{th}$ adjustment processing meet a $K^{th}$ iterative condition, and the $K^{th}$ iterative condition includes: a width of a $K^{th}$ beam is a $K^{th}$ width, and the second antenna 320 is located within a coverage scope of the $K^{th}$ beam, where the $K^{th}$ width is less than a $(K-1)^{th}$ width, and the coverage scope of the $K^{th}$ beam is within a coverage scope of a $(K-1)^{th}$ beam, where the $(K-1)^{th}$ beam is a beam that is formed by the signals after $K-1^{th}$ adjustment processing, N≥2, and K is an integer greater than or equal to 2 and less than or equal to N; and when K is equal to N, the phase and the amplitude of the signal after the $K^{th}$ adjustment processing meet an $N^{th}$ iterative condition and meet the target preset condition.

Optionally, in an embodiment, before performing the $K^{th}$ adjustment processing, the apparatus 530 for antenna alignment is further configured to:

adjust a mechanical horizontal angle and a mechanical pitch angle of the second antenna 320, so that a power of the $(K-1)^{th}$ beam received by the second antenna 320 is the maximum.

Optionally, in an embodiment, before performing the $K^{th}$ adjustment processing, the apparatus 330 for antenna alignment is further configured to:

adjust the mechanical horizontal angle and the mechanical pitch angle of the first antenna 510 according to a difference between a horizontal angle of the $(K-1)^{th}$ beam and the mechanical horizontal angle of the current mechanical location of the first antenna 510 and a difference between a pitch angle of the $(K-1)^{th}$ beam and the mechanical pitch angle of the current mechanical location of the first antenna 510.

Optionally, in an embodiment, the performing, by the apparatus 330 for antenna alignment, the $K^{th}$ adjustment processing includes:

adjusting, according to the $K^{th}$ iterative condition, the phase and the amplitude of the signal that is transmitted by each antenna unit of the first antenna 310, so that the signals that are transmitted by the multiple antenna units after the $K^{th}$ adjustment processing form the $K^{th}$ beam, where a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$ and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \text{Re}\left\{\left(\tilde{c}_m - \frac{j\tilde{f}_w}{|f_w|^2}\text{Im}\{\tilde{c}_m f_w^*\}\right)(f_w - \tilde{f}_w)^*\right\} d\phi d\varphi \\ \theta_m^{(K)} = \theta_m^{(K-1)} + \\ 2h\mu \int_{\phi,\varphi} e^{h|f_w - \tilde{f}_w|^2} \text{Im}\left\{\left(c_m + \frac{\tilde{f}_w}{|f_w|^2}\text{Re}\{c_m f_w\}\right)(f_w - \tilde{f}_w)^*\right\} d\phi d\varphi \end{cases}$$

$$\tilde{c}_m = e^{j(\frac{2\pi}{\lambda}md\sin\phi + \theta_m)} \quad c_m = r_m e^{j(\frac{2\pi}{\lambda}md\sin\phi + \theta_m)}$$

$$f_w(\phi, \varphi) = \sum_{m=0}^{M-1} w_m e^{j\frac{2\pi}{\lambda}(x_m, y_m, z_m)\begin{pmatrix}\cos\varphi\sin\phi\\\cos\varphi\cos\phi\\-\sin\varphi\end{pmatrix}}$$

$$= \sum_{m=0}^{M-1} w_m e^{j\frac{2\pi}{\lambda}(x_m \cos\varphi\sin\phi - z_m \sin\varphi)}$$

$$\tilde{f}_w(\phi, \varphi) = A e^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna 310, $(x_m, y_m, z_m)$ is coordinates of the $m^{th}$ antenna unit relative to the first antenna 310, $\phi$ and $\varphi$ are respectively a relative horizontal angle value range and a relative pitch angle value range of the $K^{th}$ beam relative to the current mechanical location of the first antenna 310, and $\phi$ and $\varphi$ enable the width of the $K^{th}$ beam to be the $K^{th}$ width and the second antenna 320 to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

Optionally, in an embodiment, the target width is five degrees.

Optionally, in an embodiment, the apparatus 330 for antenna alignment is further configured to:

before performing, according to the target preset condition, the adjustment processing on the phase and the amplitude of the signal that is transmitted by each antenna unit, obtain location information of the first antenna 310 and the second antenna 320 that are to be aligned; and adjust the mechanical horizontal angles and the mechanical pitch angles of the first antenna 310 and the second antenna 320 according to the location information.

Optionally, in an embodiment, the obtaining, by the apparatus 330 for antenna alignment, location information of the first antenna 310 and the second antenna 320 that are to be aligned includes:

obtaining the location information, of the first antenna 310 and the second antenna 320, obtained by means of triangulation or global positioning system GPS positioning.

Therefore, by means of the system for antenna alignment in this embodiment of the present disclosure, a phase and an amplitude of a signal that is transmitted by each antenna unit of a transmit antenna are adjusted, so that signals that are transmitted by multiple antenna units of the transmit antenna form a target beam whose width is less than or equal to a target width; moreover, the target beam covers a receive antenna, and a mechanical horizontal angle and a mechanical pitch angle of the transmit antenna are adjusted according to a direction of the target beam, so that convenient and quick antenna alignment with high accuracy can be implemented.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for antenna alignment for use by an apparatus for antenna alignment in a system having a first antenna and a second antenna, wherein the first antenna comprises multiple antenna units, the method comprising:

performing, according to a target preset condition, adjustment processing on a phase and an amplitude of a signal transmitted by each antenna unit of the first antenna, wherein the target preset condition includes a width of a target beam is less than or equal to a target width, wherein the second antenna is located within a coverage scope of the target beam, and wherein the target beam is formed by signals transmitted by the multiple antenna units of the first antenna after the adjustment processing;

determining that a difference between a horizontal angle of the target beam and a mechanical horizontal angle of a current mechanical location of the first antenna is a horizontal angle that needs to be adjusted of the first antenna;

determining that a difference between a pitch angle of the target beam and a mechanical pitch angle of the current mechanical location of the first antenna is a pitch angle that needs to be adjusted of the first antenna; and adjusting the mechanical horizontal angle and the mechanical pitch angle of the first antenna according to the horizontal angle that needs to be adjusted and the pitch angle that needs to be adjusted.

2. The method according to claim 1, wherein after performing, according to the target preset condition, adjustment processing on the phase and the amplitude of the signal transmitted by each antenna unit, the method further comprises:
  adjusting a mechanical horizontal angle and a mechanical pitch angle of the second antenna, so that a power of the target beam received by the second antenna is a maximum.

3. The method according to claim 1, wherein performing, according to the target preset condition, adjustment processing on the phase and the amplitude of the signal transmitted by each antenna unit comprises:
  performing, according to N iterative conditions, N times of adjustment processing on the phase and the amplitude of the signal transmitted by each antenna unit;
  wherein a phase and an amplitude of the signal after first adjustment processing meet a first iterative condition, and the first iterative condition includes a width of a first beam is a first width, wherein the second antenna is located within a coverage scope of the first beam, and wherein the first beam is formed by the signals after the first adjustment processing;
  wherein a phase and an amplitude of the signal after $K^{th}$ adjustment processing meet a $K^{th}$ iterative condition, and the $K^{th}$ iterative condition includes a width of a $K^{th}$ beam is a $K^{th}$ width, wherein the second antenna is located within a coverage scope of the $K^{th}$ beam, and wherein the $K^{th}$ width is less than a $(K-1)^{th}$ width, and the coverage scope of the $K^{th}$ beam is within a coverage scope of a $(K-1)^{th}$ beam, wherein the $(K-1)^{th}$ beam is formed by the signals after $K-1^{th}$ adjustment processing, $N \geq 2$, and K is an integer greater than or equal to 2 and less than or equal to N; and
  wherein when K is equal to N, the phase and the amplitude of the signal after the $K^{th}$ adjustment processing meet an $N^{th}$ iterative condition and meet the target preset condition.

4. The method according to claim 3, wherein before the $K^{th}$ adjustment processing is performed, the method further comprises:
  adjusting a mechanical horizontal angle and a mechanical pitch angle of the second antenna, so that a power of the $(K-1)^{th}$ beam received by the second antenna is a maximum.

5. The method according to claim 3, wherein before the $K^{th}$ adjustment processing is performed, the method further comprises:
  adjusting the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

6. The method according to claim 3, wherein performing the $K^{th}$ adjustment processing comprises:
  adjusting, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, wherein a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$ and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \text{Re}\left\{\left(\tilde{c}_m - \frac{j\tilde{f}_w}{|f_w|^2}\text{Im}\{\tilde{c}_m f_w^*\}\right)(f_w - \tilde{f}_w)^*\right\} d\phi d\varphi \\ \theta_m^{(K)} = \theta_m^{(K-1)} + \\ 2h\mu \int_{\phi,\varphi} e^{h|f_w - \tilde{f}_w|^2} \text{Im}\left\{\left(c_m + \frac{\tilde{f}_w}{|f_w|^2}\text{Re}\{c_m f_w\}\right)(f_w - \tilde{f}_w)^*\right\} d\phi d\varphi \end{cases}$$

$$\tilde{c}_m = e^{j\left(\frac{2\pi}{\lambda} m d \sin\phi + \theta_m\right)} \quad c_m = r_m e^{j\left(\frac{2\pi}{\lambda} m d \sin\phi + \theta_m\right)}$$

$$f_w(\phi,\varphi) = \sum_{m=0}^{M-1} w_m e^{j\frac{2\pi}{\lambda}(x_m,y_m,z_m)\begin{pmatrix}\cos\varphi\sin\phi\\ \cos\varphi\cos\phi\\ -\sin\varphi\end{pmatrix}}$$

$$= \sum_{m=0}^{M-1} w_m e^{j\frac{2\pi}{\lambda}(x_m\cos\varphi\sin\phi - z_m\sin\varphi)}$$

$$\tilde{f}_w(\phi,\varphi) = A e^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m,y_m,z_m)$ are coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

7. The method according to claim 1, wherein the target width is five degrees.

8. The method according to claim 1, wherein before performing, according to the target preset condition, adjustment processing on the phase and the amplitude of the signal transmitted by each antenna unit, the method further comprises:
  obtaining location information of the first antenna and the second antenna that are to be aligned; and
  adjusting the mechanical horizontal angles and the mechanical pitch angles of the first antenna and the second antenna according to the location information.

9. The method according to claim 8, wherein obtaining location information of the first antenna and the second antenna that are to be aligned comprises:
  obtaining the location information of the first antenna and the second antenna using triangulation or global positioning system (GPS) positioning.

10. A device for antenna alignment, the device is configured to communicate with a first antenna and a second antenna, the device comprising:
  a bus;
  a processor connected to the bus; and
  a memory connected to the bus and for storing a program, wherein the program, when executed by the processor, causes the processor to:
    perform, according to a target preset condition, adjustment processing on a phase and an amplitude of a signal transmitted by each antenna unit of the first antenna, wherein the target preset condition includes a width of a target beam is less than or equal to a target width, wherein the second antenna is located within a coverage scope of the target beam, and wherein the target beam is formed by signals that are transmitted by multiple antenna units of the first antenna after the adjustment processing, determine that a difference between a horizontal angle of the target beam and a mechanical horizontal angle of a current mechanical location of the first antenna is a horizontal angle that needs to be adjusted of the first antenna, determine that a difference between a pitch angle of the target beam and a mechanical pitch angle of the current mechanical location of the first antenna is a pitch angle that needs to be adjusted of the first antenna, and adjust the mechanical horizontal angle and the mechanical pitch angle of the first antenna according to the horizontal angle that needs to be adjusted and the pitch angle that needs to be adjusted.

11. The device according to claim 10, wherein the program, when executed by the processor, further causes the processor to:

after performing, according to the target preset condition, the adjustment processing on the phase and the amplitude of the signal transmitted by each antenna unit, adjust a mechanical horizontal angle and a mechanical pitch angle of the second antenna, so that a power of the target beam received by the second antenna is a maximum.

12. The device according to claim 11, wherein the program, when executed by the processor, causes the processor to:

perform, according to N iterative conditions, N times of adjustment processing on the phase and the amplitude of the signal transmitted by each antenna unit;

wherein a phase and an amplitude of the signal after first adjustment processing meet a first iterative condition, and the first iterative condition includes a width of a first beam is a first width, wherein the second antenna is located within a coverage scope of the first beam, and wherein the first beam is formed by the signals after the first adjustment processing;

wherein a phase and an amplitude of the signal after $K^{th}$ adjustment processing meet a $K^{th}$ iterative condition, and the $K^{th}$ iterative condition includes a width of a $K^{th}$ beam is a $K^{th}$ width, wherein the second antenna is located within a coverage scope of the $K^{th}$ beam, and wherein the $K^{th}$ width is less than a $(K-1)^{th}$ width, and the coverage scope of the $K^{th}$ beam is within a coverage scope of a $(K-1)^{th}$ beam, wherein the $(K-1)^{th}$ beam is formed by the signals after $K-1^{th}$ adjustment processing, $N \geq 2$, and K is an integer greater than or equal to 2 and less than or equal to N; and wherein when K is equal to N, the phase and the amplitude of the signal after the $K^{th}$ adjustment processing meet an $N^{th}$ iterative condition and meet the target preset condition.

13. The device according to claim 12, wherein the program, when executed by the processor, causes the processor to:

before performing the $K^{th}$ adjustment processing, adjust a mechanical horizontal angle and a mechanical pitch angle of the second antenna, so that a power of the $(K-1)^{th}$ beam received by the second antenna is a maximum.

14. The device according to claim 12, wherein the program, when executed by the processor, causes the processor to:

before performing the $K^{th}$ adjustment processing, adjust the mechanical horizontal angle and the mechanical pitch angle of the first antenna according to a difference between a horizontal angle of the $(K-1)^{th}$ beam and the mechanical horizontal angle of the current mechanical location of the first antenna and a difference between a pitch angle of the $(K-1)^{th}$ beam and the mechanical pitch angle of the current mechanical location of the first antenna.

15. The device according to claim 12, wherein the program, when executed by the processor, causes the processor to:

adjust, according to the $K^{th}$ iterative condition, the phase and the amplitude of the signal that is transmitted by each antenna unit of the first antenna, so that the signals that are transmitted by the multiple antenna units after the $K^{th}$ adjustment processing form the $K^{th}$ beam, wherein a phase is $\theta_m^{(K-1)}$ and an amplitude is $r_m^{(K-1)}$ when an $m^{th}$ antenna unit of the multiple antenna units sends the $(K-1)^{th}$ beam, and a phase $\theta_m^{(K)}$ and an amplitude $r_m^{(K)}$ when the $m^{th}$ antenna unit sends the $K^{th}$ beam are determined according to the following formulas:

$$\begin{cases} r_m^{(K)} = r_m^{(K-1)} - \\ 2h\mu \int_{\phi,\varphi} e^{h|f_w - \tilde{f}_w|^2} \text{Re}\left\{\left(\tilde{c}_m - \frac{j\tilde{f}_w}{|f_w|^2}\text{Im}\{\tilde{c}_m f_w^*\}\right)(f_w - \tilde{f}_w)^*\right\} d\phi d\varphi \\ \theta_m^{(K)} = \theta_m^{(K-1)} + \\ 2h\mu \int_{\phi,\varphi} e^{h|f_w - \tilde{f}_w|^2} \text{Im}\left\{\left(c_m + \frac{\tilde{f}_w}{|f_w|^2}\text{Re}\{c_m f_w\}\right)(f_w - \tilde{f}_w)^*\right\} d\phi d\varphi \end{cases}$$

$$\tilde{c}_m = e^{j\left(\frac{2\pi}{\lambda} m d \sin\phi + \theta_m\right)} \quad c_m = r_m e^{j\left(\frac{2\pi}{\lambda} m d \sin\phi + \theta_m\right)}$$

$$f_w(\phi,\varphi) = \sum_{m=0}^{M-1} w_m e^{j\frac{2\pi}{\lambda}(x_m, y_m, z_m)\begin{pmatrix} \cos\varphi\sin\phi \\ \cos\varphi\cos\phi \\ -\sin\varphi \end{pmatrix}}$$

$$= \sum_{m=0}^{M-1} w_m e^{j\frac{2\pi}{\lambda}(x_m \cos\varphi\sin\phi - z_m \sin\varphi)}$$

$$\tilde{f}_w(\phi,\varphi) = A e^{j\arg(f_w(\phi,\varphi))}$$

where an initial value is $r_m^{(1)}=1$, $\theta_m^{(1)}=0$, $\mu$ is an iteration step parameter with a value range of 0.01 to 0.1, h and A are iterative algorithm internal parameters, a value range of h is 1 to 4, a value range of A is 0.6 to 1, M is a total quantity of antenna units in the first antenna, $(x_m, y_m, z_m)$ are coordinates of the $m^{th}$ antenna unit relative to the first antenna, $\phi$ and $\varphi$ are respectively a horizontal angle value range and a pitch angle value range of the $K^{th}$ beam relative to the current mechanical location of the first antenna, and $\phi$ and $\varphi$ enable the width of the $K^{th}$ beam to be the $K^{th}$ width and the second antenna to be located in the coverage scope of the $K^{th}$ beam, where the $K^{th}$ width is less than the $(K-1)^{th}$ width, and the coverage scope of the $K^{th}$ beam is within the coverage scope of the $(K-1)^{th}$ beam.

16. The device according to claim 10, wherein the target width is five degrees.

17. The device according to claim 10, wherein:
the device further comprises:
- a receiver, configured to: before performing the adjustment processing, according to the target preset condition, on the phase and the amplitude of the signal transmitted by each antenna unit, obtain location information of the first antenna and the second antenna that are to be aligned; and the program, when executed by the processor, causes the processor to:
- adjust the mechanical horizontal angles and the mechanical pitch angles of the first antenna and the second antenna according to the location information.

18. The device according to claim 17, wherein the receiver is configured to:
- obtain the location information of the first antenna and the second antenna using triangulation or global positioning system GPS positioning.

19. A system for antenna alignment, comprising:
- a first antenna, comprising multiple antenna units;
- a second antenna; and
- a device for antenna alignment, the device configured to communicate with the first antenna and the second antenna, the device comprising:
  - a bus;
  - a processor connected to the bus; and
  - a memory connected to the bus and for storing a program, wherein the program, when executed by the processor, causes the processor to:
    - perform, according to a target preset condition, adjustment processing on a phase and an amplitude of a signal transmitted by each antenna unit of the first antenna, wherein the target preset condition includes a width of a target beam is less than or equal to a target width, wherein the second antenna is located within a coverage scope of the target beam, and wherein the target beam is formed by signals that are transmitted by multiple antenna units of the first antenna after the adjustment processing,
    - determine that a difference between a horizontal angle of the target beam and a mechanical horizontal angle of a current mechanical location of the first antenna is a horizontal angle that needs to be adjusted of the first antenna,
    - determine that a difference between a pitch angle of the target beam and a mechanical pitch angle of the current mechanical location of the first antenna is a pitch angle that needs to be adjusted of the first antenna, and
  - adjust the mechanical horizontal angle and the mechanical pitch angle of the first antenna according to the horizontal angle that needs to be adjusted and the pitch angle that needs to be adjusted.

* * * * *